(12) United States Patent
Huang et al.

(10) Patent No.: US 11,917,664 B2
(45) Date of Patent: Feb. 27, 2024

(54) TECHNIQUES FOR COUNTING A SCHEDULING REQUEST PERIODICITY

(71) Applicant: QUALCOMM Incorporated, San Diego, CA (US)

(72) Inventors: Yi Huang, San Diego, CA (US); Juan Montojo, San Diego, CA (US); Kausik Ray Chaudhuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/399,887

(22) Filed: Aug. 11, 2021

(65) Prior Publication Data
US 2023/0052556 A1 Feb. 16, 2023

(51) Int. Cl.
*H04W 72/12* (2023.01)
*H04W 72/50* (2023.01)
*H04W 72/20* (2023.01)
*H04W 72/1263* (2023.01)

(52) U.S. Cl.
CPC ..... *H04W 72/535* (2023.01); *H04W 72/1263* (2013.01); *H04W 72/20* (2023.01)

(58) Field of Classification Search
None
See application file for complete search history.

(56) References Cited

U.S. PATENT DOCUMENTS

2012/0182908 A1* 7/2012 Pan .............. H04W 72/23
370/280
2019/0045529 A1* 2/2019 Xiong ............ H04L 5/0048

OTHER PUBLICATIONS

Intel Corporation: "UL Data Transmission Procedures in NR", 3GPP TSG RAN WG1 Meeting 90bis, R1-1717396, 3rd Generation Partnership Project, Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 13, 2017, pp. 1-12, XP051340586, Paragraph 3.01.
International Search Report and Written Opinion—PCT/US2022/073458—ISA/EPO—dated Nov. 7, 2022.

* cited by examiner

*Primary Examiner* — Kouroush Mohebbi
(74) *Attorney, Agent, or Firm* — Holland & Hart LLP /Qualcomm Incorporated

(57) ABSTRACT

Methods, systems, and devices for wireless communication are described to support reducing conflicts with between scheduling request opportunities and downlink resources. A base station may configure a user equipment (UE) with a scheduling request periodicity and offset for identifying scheduling request opportunities. The UE and base station may apply the periodicity and the offset to a first subset of time periods of a set of multiple time periods, where the first subset of time periods may include scheduling request opportunities that do not overlap with resources allocated for downlink transmissions. Based on applying the offset and periodicity to the first subset of time periods, the UE may identify a scheduling request opportunity, in a first time period of the first subset, and may transmit a scheduling request to the base station via the scheduling request opportunity.

30 Claims, 16 Drawing Sheets

TECHNIQUES FOR COUNTING A SCHEDULING REQUEST PERIODICITY

FIELD OF TECHNOLOGY

The following relates to wireless communication, including techniques for counting a scheduling request periodicity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may determine to transmit a scheduling request to a base station, to request resources for an uplink transmission. In some cases, however, a number of opportunities or resources for transmitting the scheduling request may be reduced.

SUMMARY

The described techniques relate to improved methods, systems, devices, and apparatuses that support techniques for counting a scheduling request periodicity. Generally, the described techniques provide for increasing a number of available scheduling request opportunities and/or reducing conflicts with between scheduling request opportunities and downlink resources. For example, a base station may configure a user equipment (UE) with a scheduling request periodicity and offset, and the UE and base station may apply the periodicity and offset to time periods in which scheduling request resources do not conflict with any resources allocated for downlink transmissions. The UE may, for example, apply the periodicity and the offset to a first subset of time periods of a resource configuration (e.g., that includes a set of multiple time periods), where the first subset of time periods may include scheduling request opportunities that do not overlap with resources allocated for downlink transmissions. Based on applying the offset and periodicity to the first subset of time periods, the UE may identify one or more scheduling request opportunities, and may transmit a scheduling request to the base station, via one of the identified scheduling request opportunities (e.g., in a first time period).

A method for wireless communication at a UE is described. The method may include receiving, from a base station, control signaling indicating a periodicity and an offset applicable to transmission of scheduling requests from the UE to the base station and transmitting a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period.

An apparatus for wireless communication at a UE is described. The apparatus may include a processor, memory coupled with the processor, and instructions stored in the memory. The instructions may be executable by the processor to cause the apparatus to receive, from a base station, control signaling indicating a periodicity and an offset applicable to transmission of scheduling requests from the UE to the base station and transmit a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period.

Another apparatus for wireless communication at a UE is described. The apparatus may include means for receiving, from a base station, control signaling indicating a periodicity and an offset applicable to transmission of scheduling requests from the UE to the base station and means for transmitting a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period.

A non-transitory computer-readable medium storing code for wireless communication at a UE is described. The code may include instructions executable by a processor to receive, from a base station, control signaling indicating a periodicity and an offset applicable to transmission of scheduling requests from the UE to the base station and transmit a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period.

Some examples of the method, apparatuses, and non-transitory computer-readable medium described herein may further include operations, features, means, or instructions for refraining from applying the periodicity and the offset to a second subset of time periods of the set of multiple time periods, where for the second subset of time periods the resources for transmission of scheduling requests at least partially overlap with resources allocated for downlink transmissions.

In some examples of the method, apparatuses, and non-transitory computer-readable medium described herein, the resources allocated for downlink transmissions for the second subset of time periods include one or more resources allocated for a downlink shared channel, a downlink control channel, a synchronization signal block transmission, a control resource set, or any combination thereof.

In some examples of the method, apparatuses, and non-transitory computer-readable medium described herein, the set of multiple time periods includes a second time period that includes a first portion allocated for downlink transmissions and a second portion allocated for uplink transmissions, and the second subset of time periods includes the second time period based on determining that the first portion allocated for downlink transmissions overlaps with one or more symbols for transmission of scheduling requests.

In some examples of the method, apparatuses, and non-transitory computer-readable medium described herein, the set of multiple time periods includes a third time period that includes a first portion allocated for downlink transmissions and a second portion allocated for uplink transmissions, and the first subset of time periods includes the third time period based on determining that the resources for transmission of scheduling requests overlap with a portion of the third time period allocated for uplink transmissions.

Some examples of the method, apparatuses, and non-transitory computer-readable medium described herein may further include operations, features, means, or instructions for determining a starting time period of the set of multiple time periods for applying the offset, the starting time period included in the first subset of time periods and identifying a fourth time period of the set of multiple time periods that includes a first set of resources for transmission of scheduling requests based on applying the offset to the starting time period, the fourth time period included in the first subset of time periods, where transmitting the scheduling request may be based on identifying the fourth time period.

Some examples of the method, apparatuses, and non-transitory computer-readable medium described herein may further include operations, features, means, or instructions for identifying a fifth time period of the set of multiple time periods that includes a fourth set of resources for transmission of scheduling requests based on applying the periodicity between the fourth time period and the fifth time period, the fifth time period included in the first subset of time periods.

Some examples of the method, apparatuses, and non-transitory computer-readable medium described herein may further include operations, features, means, or instructions for receiving control signaling indicating a second periodicity and a second offset applicable to transmission of scheduling requests from the UE to the base station, where the periodicity and the offset may be applicable to a first configuration for the set of multiple time periods and the second periodicity and the second offset may be applicable to a second configuration for the set of multiple time periods.

In some examples of the method, apparatuses, and non-transitory computer-readable medium described herein, each of the set of multiple time periods corresponds to a respective slot.

In some examples of the method, apparatuses, and non-transitory computer-readable medium described herein, each of the set of multiple time periods corresponds to a respective symbol.

A method for wireless communication at a base station is described. The method may include transmitting, to a UE, control signaling indicating a periodicity and an offset applicable to transmission of scheduling requests from the UE to the base station and monitoring for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a periodicity and an offset applicable to transmission of scheduling requests from the UE to the base station and monitor for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions.

Another apparatus for wireless communication at a base station is described. The apparatus may include means for transmitting, to a UE, control signaling indicating a periodicity and an offset applicable to transmission of scheduling requests from the UE to the base station and means for monitoring for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions.

A non-transitory computer-readable medium storing code for wireless communication at a base station is described. The code may include instructions executable by a processor to transmit, to a UE, control signaling indicating a periodicity and an offset applicable to transmission of scheduling requests from the UE to the base station and monitor for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions.

Some examples of the method, apparatuses, and non-transitory computer-readable medium described herein may further include operations, features, means, or instructions for refraining from applying the periodicity and the offset to a second subset of time periods of the set of multiple time periods, where for the second subset of time periods the resources for transmission of scheduling requests at least partially overlap with resources allocated for downlink transmissions.

In some examples of the method, apparatuses, and non-transitory computer-readable medium described herein, the resources allocated for downlink transmissions for the second subset of time periods include one or more resources allocated for a downlink shared channel, a downlink control channel, a synchronization signal block transmission, a control resource set, or any combination thereof.

In some examples of the method, apparatuses, and non-transitory computer-readable medium described herein, the set of multiple time periods includes a second time period that includes a first portion allocated for downlink transmissions and a second portion allocated for uplink transmissions, and the second subset of time periods includes the second time period based on determining that the first portion allocated for downlink transmissions overlaps with one or more symbols for transmission of scheduling requests.

In some examples of the method, apparatuses, and non-transitory computer-readable medium described herein, the set of multiple time periods includes a third time period that includes a first portion allocated for downlink transmissions and a second portion allocated for uplink transmissions, and the first subset of time periods includes the third time period based on determining that the resources for transmission of scheduling requests overlap with a portion of the third time period allocated for uplink transmissions.

Some examples of the method, apparatuses, and non-transitory computer-readable medium described herein may further include operations, features, means, or instructions for determining a starting time period of the set of multiple time periods for applying the offset, the starting time period included in the first subset of time periods and identifying a fourth time period of the set of multiple time periods that includes a first set of resources for transmission of scheduling requests based on applying the offset to the starting time period, the fourth time period included in the first subset of time periods, where monitoring for the scheduling request may be based on identifying the fourth time period.

Some examples of the method, apparatuses, and non-transitory computer-readable medium described herein may further include operations, features, means, or instructions for identifying a fifth time period of the set of multiple time periods that includes a fourth set of resources for transmission of scheduling requests based on applying the periodicity between the fourth time period and the fifth time period, the fifth time period included in the first subset of time periods.

Some examples of the method, apparatuses, and non-transitory computer-readable medium described herein may further include operations, features, means, or instructions for transmitting control signaling indicating a second periodicity and a second offset applicable to transmission of scheduling requests from the UE to the base station, where the periodicity and the offset may be applicable to a first configuration for the set of multiple time periods and the second periodicity and the second offset may be applicable to a second configuration for the set of multiple time periods.

In some examples of the method, apparatuses, and non-transitory computer-readable medium described herein, each of the set of multiple time periods corresponds to a respective slot.

In some examples of the method, apparatuses, and non-transitory computer-readable medium described herein, each of the set of multiple time periods corresponds to a respective symbol.

DETAILED DESCRIPTION

Figure 1:
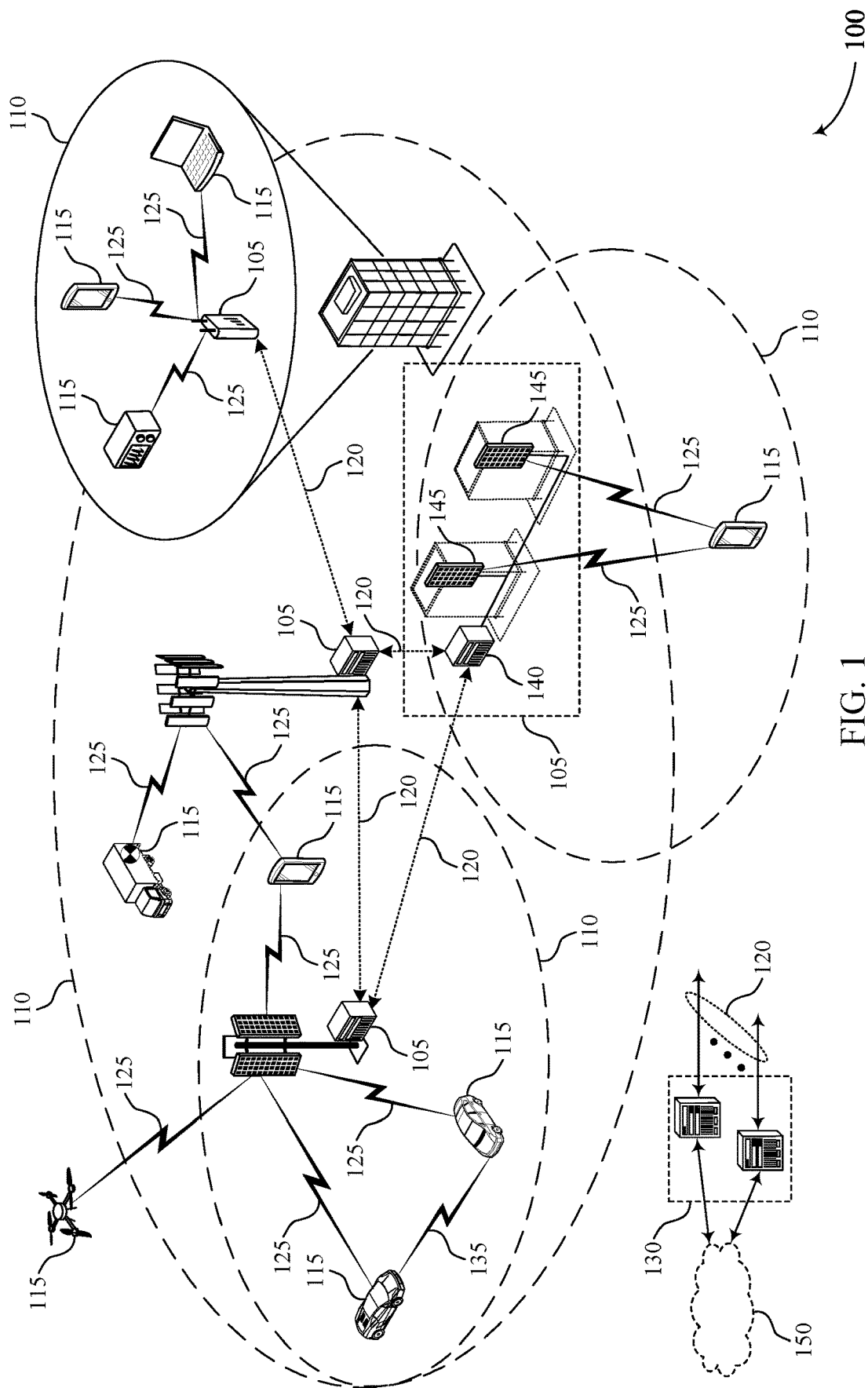
FIG. 1 illustrates an example of a wireless communications system that supports techniques for counting a scheduling request periodicity in accordance with aspects of the present disclosure.

A base station and a user equipment (UE) may communicate in the downlink and the uplink, using corresponding communication resources (e.g., time and frequency resources). For example, the UE may identify data for uplink transmission (e.g., to the base station) and may transmit a scheduling request that requests uplink transmission resources from the base station (e.g., for the uplink transmission). The UE may, for example, transmit the scheduling request using a scheduling request opportunity. As described herein, a scheduling request opportunity may represent communication resources (e.g., uplink channel resources, such as resources for an uplink control channel) used for transmission of scheduling requests from the UE to the base station. Scheduling request opportunities may repeat in time and may, in some cases, be associated with a configured scheduling request offset and periodicity, which may be configured by the base station.

For example, the base station may transmit control signaling to the UE, which may configure the UE with a scheduling request offset and periodicity for scheduling request opportunities. The scheduling request offset and periodicity may be configured in terms of slots or in terms of symbols, among other examples, which may be referred to herein (e.g., collectively or individually) as time periods. A scheduling request offset may represent a number of time periods (e.g., slots or symbols) counted from a starting time period to a first scheduling request opportunity (e.g., to a first slot or symbol including a scheduling request opportunity). A scheduling request periodicity may represent a number of time periods counted between scheduling request opportunities, starting after the first scheduling request opportunity.

In some cases, the scheduling request periodicity and offset may be counted over each physical time period (e.g., a downlink, uplink, or special time period) of a resource configuration for communications between the UE and the base station (e.g., a time division duplexing (TDD) carrier configured with downlink, uplink, and special time periods).

For example, the scheduling request and periodicity may be counted whether or not a time period may be used for transmission of a scheduling request. Scheduling request opportunities that conflict with downlink resources of a resource configuration (e.g., occur in a time period designated for downlink communications) may not be used by the UE for transmission of a scheduling request, even though such time periods may be counted using the periodicity and the offset. In such cases, the UE may drop or cancel these scheduling request opportunities. For example, if a scheduling request opportunity at least partially overlaps with a downlink time period (e.g., slot or symbol of the TDD configuration) the UE may cancel, or ignore, the scheduling request opportunity (e.g., may not use the scheduling request opportunity for transmission of a scheduling request), which may reduce a number of scheduling request opportunities available for the UE.

The present disclosure provides techniques for increasing a number of available scheduling request opportunities and/or reducing conflicts with between scheduling request opportunities and downlink resources. For example, the UE and the base station may only apply the scheduling request periodicity and offset to time periods in which scheduling request resources do not conflict with any resources allocated for downlink transmissions. The UE may, for example, apply the periodicity and the offset to a first subset of time periods of a resource configuration (e.g., that includes a set of multiple time periods), where the first subset of time periods may include time periods that do not overlap with resources allocated for downlink transmissions. For example, the UE may refrain from applying the offset to time periods that include only downlink resources or that include downlink resources which at least partially overlap with resources associated with a scheduling request opportunity within the time periods. By counting the scheduling request periodicity and offset with respect to time periods that do not create a conflict between the scheduling request opportunities and downlink resources, the scheduling request opportunities may avoid collisions with downlink resources, which may increase a number of available scheduling request opportunities.

Based on applying the offset and periodicity to non-conflicting time periods, the UE may identify one or more scheduling request opportunities, and may transmit a scheduling request to the base station, via one of the identified scheduling request opportunities (e.g., in a first time period). Based on the transmitted scheduling request, the base station may allocate uplink resources to the UE, such that the UE and the base station may communicate in the uplink using the allocated resources.

Aspects of the disclosure are initially described in the context of wireless communications systems. Aspects of the disclosure are further illustrated by and described with reference to a resource configuration, a process flow, apparatus diagrams, system diagrams, and flowcharts that relate to techniques for counting a scheduling request periodicity.

FIG. 1 illustrates an example of a wireless communications system 100 that supports techniques for counting a scheduling request periodicity in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A base station 105 may configure a UE 115 with a scheduling request periodicity and offset, and the UE 115 and base station 105 may apply the periodicity and offset to time periods in which scheduling request resources do not conflict with any resources allocated for downlink transmissions. The UE 115 may, for example, apply the periodicity and the offset to a first subset of time periods of a resource configuration (e.g., that includes a set of multiple time periods), where the first subset of time periods may include resources for scheduling request opportunities that do not overlap with resources allocated for downlink transmissions. Based on applying the offset and periodicity to the first subset of time periods, the UE 115 may identify one or more scheduling request opportunities, and may transmit a scheduling request to the base station 105, via one of the identified scheduling request opportunities (e.g., in a first time period).

Figure 2:
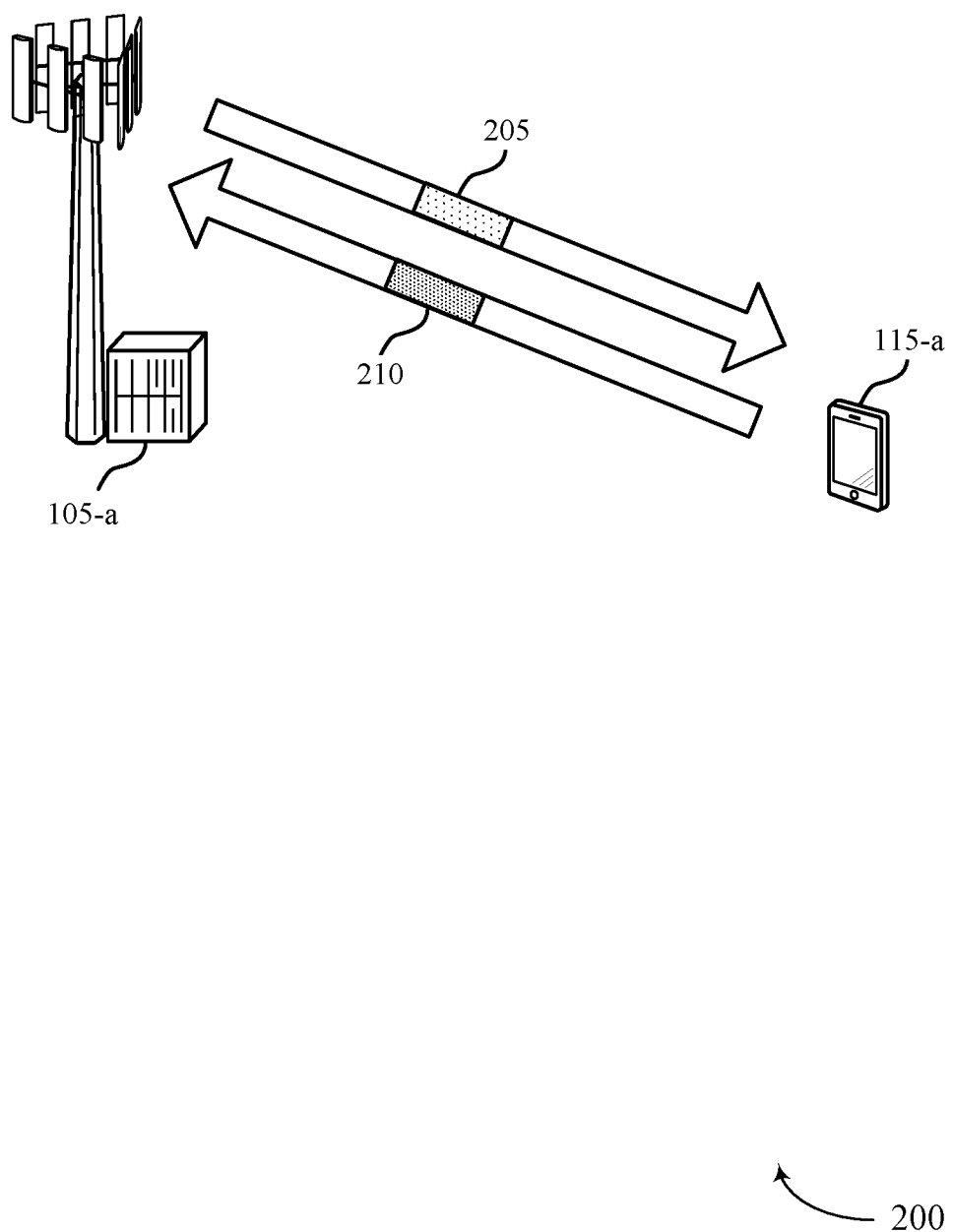
FIG. 2 illustrates an example of a wireless communications system that supports techniques for counting a scheduling request periodicity in accordance with aspects of the present disclosure.

FIG. 2 illustrates an example of a wireless communications system 200 that supports techniques for counting a scheduling request periodicity in accordance with aspects of the present disclosure. In some examples, wireless communications system 200 may implement some aspects of wireless communications system 100. For example, wireless communications system 200 may include a base station 105-a and a UE 115-a, which may be examples of a base station 105 and a UE 115 described with reference to FIG. 1. Base station 105-a and UE 115-a may communicate in the downlink and the uplink, using corresponding communication resources (e.g., time and frequency resources). For example, UE 115-a may identify data for uplink transmission (e.g., to base station 105-a) and may request uplink transmission resources from base station 105-a, such as via transmission of a scheduling request 210.

UE 115-a may, for example, transmit the scheduling request 210 using a scheduling request opportunity. As described herein, a scheduling request opportunity may represent communication resources (e.g., physical uplink control channel (PUCCH) resources) used for transmission of scheduling requests 210 from UE 115-a to base station 105-a. Scheduling request opportunities may repeat in time and may, in some cases, be associated with a configured scheduling request offset and periodicity, which may be configured by base station 105-a. For example, when operating in a TDD mode, base station 105-a may transmit control signaling 205 (e.g., RRC signaling) to UE 115-a, which may configure UE 115-a with a scheduling request offset and periodicity for scheduling request opportunities. The scheduling request offset and periodicity may be configured in terms of slots or in terms of OFDM symbols, among other examples, which may be collectively referred to herein as time periods.

A scheduling request offset may represent a number of time periods (e.g., slots or symbols) counted from a starting time period (e.g., an SFN 0) to a first scheduling request opportunity (e.g., to a first slot or symbol including a scheduling request opportunity). A scheduling request periodicity may represent a number of time periods counted between scheduling request opportunities, starting after the first scheduling request opportunity. For example, a scheduling request offset and periodicity may be two slots and four slots, respectively. As such, UE 115-a may identify a first scheduling request opportunity in a first slot that occurs two slots (e.g., the offset) after a starting slot (e.g., SFN 0). UE 115-a may further identify a second scheduling request opportunity within a second slot that follows four slots (e.g., the periodicity) after the first slot, and may identify following scheduling request opportunities every four slots (e.g., the periodicity).

The scheduling request periodicity and offset may be counted over each physical time period (e.g., a downlink, uplink, or special time period), whether or not the time period may be used for transmission of a scheduling request 210. For example, any scheduling request opportunities that conflict with downlink resources of a TDD configuration (e.g., occur in slots or symbols designated for downlink in the TDD configuration) may not be used by UE 115-a for transmission of a scheduling request 210. In the example of a periodicity of four slots, UE 115-a may identify scheduling request opportunities every four slots, which may include identifying some scheduling request opportunities in downlink designated slots, or at least partially overlapping with downlink designated symbols of a special slot. In such cases, UE 115-a may drop or cancel these scheduling request opportunities. Additionally, configuring the periodicity to fully utilize all available uplink symbols (e.g., configuring the periodicity to be one slot) may reduce available uplink resources for other transmissions from UE 115-a.

When transmitting a scheduling request 210, UE 115-a may determine whether a respective scheduling request opportunity overlaps (e.g., fully overlaps, coincides) with uplink resources (e.g., PUCCH resources). If the scheduling request opportunity coincides with uplink resources, UE 115-a may transmit a scheduling request 210 using the scheduling request opportunity. In some cases, however, a scheduling request opportunity may at least partially overlap with a downlink time period (e.g., slot or symbol) and UE 115-a may cancel, or ignore, the scheduling request opportunity (e.g., may not use the scheduling request opportunity for transmission of a scheduling request 210), which may reduce a number of scheduling request opportunities available for UE 115-a.

The present disclosure provides techniques for increasing a number of available scheduling request opportunities and/or reducing conflicts between scheduling request opportunities and downlink resources. For example, UE 115-a and base station 105-a may only apply the scheduling request periodicity and offset to time periods in which scheduling request resources do not conflict with any resources allocated for downlink transmissions. UE 115-a may, for example, apply the periodicity and the offset to a first subset of time periods of a TDD configuration (e.g., that includes a set of multiple time periods), where the first subset of time periods include scheduling request opportunities that do not overlap with resources allocated for downlink transmissions. The resources allocated for downlink transmissions may represent resources allocated for a downlink shared channel (e.g., a physical downlink shared channel (PDSCH)), a downlink control channel (e.g., a physical downlink control channel (PDCCH)), a synchronization signal block (SSB), a control resource set (CORESET), or any combination thereof.

In one example, UE 115-a may identify a first scheduling request opportunity by applying the offset to time periods which include resources for scheduling request opportunities that do not overlap with resources allocated for downlink transmissions. For example, UE 115-a may apply the offset to time periods that include only uplink resources or that include uplink resources which overlap with the resources for the scheduling request opportunities. Conversely, UE 115-a may refrain from applying the offset to time periods that include only downlink resources or that include downlink resources which at least partially overlap with the resources for the scheduling request opportunities. UE 115-a may similarly apply the periodicity to time periods which include resources for the scheduling request opportunities that do not overlap with resources allocated for downlink transmissions. By counting the scheduling request periodicity and offset with respect to time periods that do not create a conflict between the scheduling request opportunities and other transmissions, the scheduling request opportunities may avoid collisions with downlink resources, which may increase a number of available scheduling request opportunities.

Based on applying the offset and periodicity to non-conflicting time periods, UE 115-a may identify one or more scheduling request opportunities, and may transmit a scheduling request 210 to base station 105-a, via one of the identified scheduling request opportunities (e.g., in a first time period). Based on the transmitted scheduling request, base station 105-a may allocate uplink resources to UE 115-a, such that UE 115-a and base station 105-a may communicate in the uplink using the allocated resources.

Figure 3:
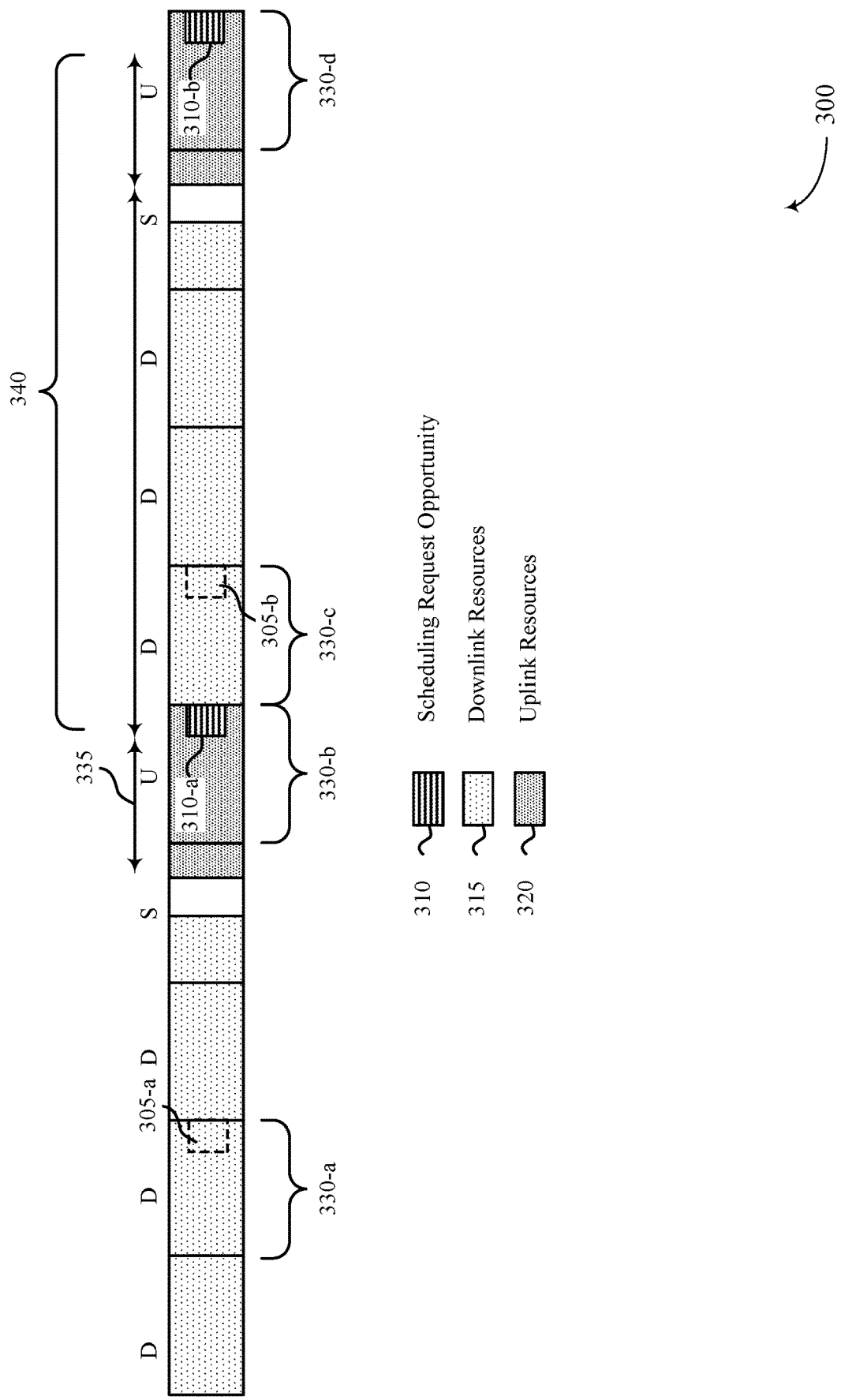
FIG. 3 illustrates an example of a resource configuration that supports techniques for counting a scheduling request periodicity in accordance with aspects of the present disclosure.

FIG. 3 illustrates an example of a resource configuration 300 that supports techniques for counting a scheduling request periodicity in accordance with aspects of the present disclosure. In some examples, resource configuration 300 may implement or be implemented by one or more aspects of wireless communications system 100 or 200. For example, resource configuration 300 may be configured for a UE 115, by a base station 105, for communications between the UE 115 and the base station 105. The UE 115 and the base station 105 may represent examples of a UE 115 and a base station 105 described with reference to FIGS. 1 and 2. The resource configuration 300 may represent a TDD configuration, and may be used in association with transmission of scheduling requests from the UE 115 to the base station, as described herein.

The configuration may include a pattern of slots 330, which may include uplink slots (e.g., U slots), downlink slots (e.g., D slots), and special slots (e.g., S slots), where a special slot may include one or both of downlink resources 315 and uplink resources 320. As described with reference to FIG. 2, in some cases, a periodicity 340 and an offset 335 configured for scheduling requests may be applied to any physical time period (e.g., any slot or any symbol thereof). As such, in some cases, some scheduling request opportunities 310 identified using the periodicity 340 and the offset 335 may fall in time periods that do not support uplink transmissions. For example, if the offset 335 is one slot 330 and the periodicity 340 is four slots 330, a first scheduling request opportunity 310 may fall in a slot 330-a and may represent an unused scheduling request opportunity 305-a. Similarly, a second scheduling request opportunity 310 may fall in a slot 330-c and may represent an unused scheduling request opportunity 305-b.

As such, as described herein with reference to FIG. 2, the UE 115 and the base station 105 may apply the periodicity 340 and the offset 335 only to time periods that do not include resources allocated for downlink transmissions (e.g., downlink resources 315) that overlap with resource for transmission of scheduling requests (e.g., scheduling request opportunities 310). For example, in order to apply the periodicity 340 and the offset 335 to the time period, the associated scheduling request opportunity 310 may not conflict with any non-uplink OFDM symbol. In such cases, the UE 115 and the base station may only apply the periodicity 340 and the offset 335 to uplink time periods (e.g., uplink slots or symbols), or to special time periods where the scheduling request opportunity 310 does not conflict with downlink resources 315.

For example, if the offset 335 is one slot 330 and the periodicity 340 is two slots 330, a first scheduling request opportunity 310-a may fall in a slot 330-b, based on applying the offset 335 of one slot from the previous slot 330 (e.g., based on only counting the offset 335 using the non-conflicting slots 330). Similarly, a second scheduling request opportunity 310-b may fall in a slot 330-d based on applying the offset 335 of two slots 330 to the following special slot and uplink slot but not to the intervening downlink slots (e.g., based on only counting the periodicity 340 using non-conflicting slots 330). In this example, the periodicity may be applied to the special slot because resources assigned for a scheduling request opportunity may not overlap or conflict with downlink resources within the special slot.

It is to be understood that while the examples described herein are related to slots 330, the same examples of applying the periodicity 340 and offset 335 may also equally apply to other time periods, such as symbols, without departing from the scope of the present disclosure. For example, if the base station 105 configures the periodicity 340 and the offset 335 in terms of symbols, the base station 105 and the UE 115 may only apply the periodicity 340 and the offset 335 to symbols of a scheduling request opportunity that do not conflict with symbols allocated for downlink resources 315.

In some cases, a scheduling request offset 335 and periodicity 340 may be different for different TDD configurations (e.g., may be based on a TDD configuration). For example, the base station 105 may configure the UE 115 with a periodicity 340 and offset 335 applicable to a first TDD configuration (e.g., a configuration of time periods) or a first group of TDD configurations and may configure the UE 115 with a second periodicity 340 and second offset 335 applicable to a second TDD configuration (e.g., a second configuration of time periods) or a second group of TDD configurations. The first TDD configuration (e.g., or first group of TDD configurations) and second TDD configuration (e.g., or second group of TDD configurations) may have different periodicities for switching between downlink and uplink time periods, and may therefore be configured with different respective offsets 335 and periodicities 340. The UE 115 and the base station 105 may use the corresponding periodicity 340 and offset 335 for identifying scheduling request opportunities 310, when the applicable TDD configuration is selected.

Using any of the examples described herein, the UE 115 may select a scheduling request opportunity 310 for transmission of a scheduling request to the base station 105. In such cases, the scheduling request opportunity 310 may not conflict with any downlink resources 315 (e.g., based on the application of the offset 335 and periodicity 340) and the UE 115 may use the selected scheduling request opportunity 310 for transmission of the scheduling request.

Figure 4:
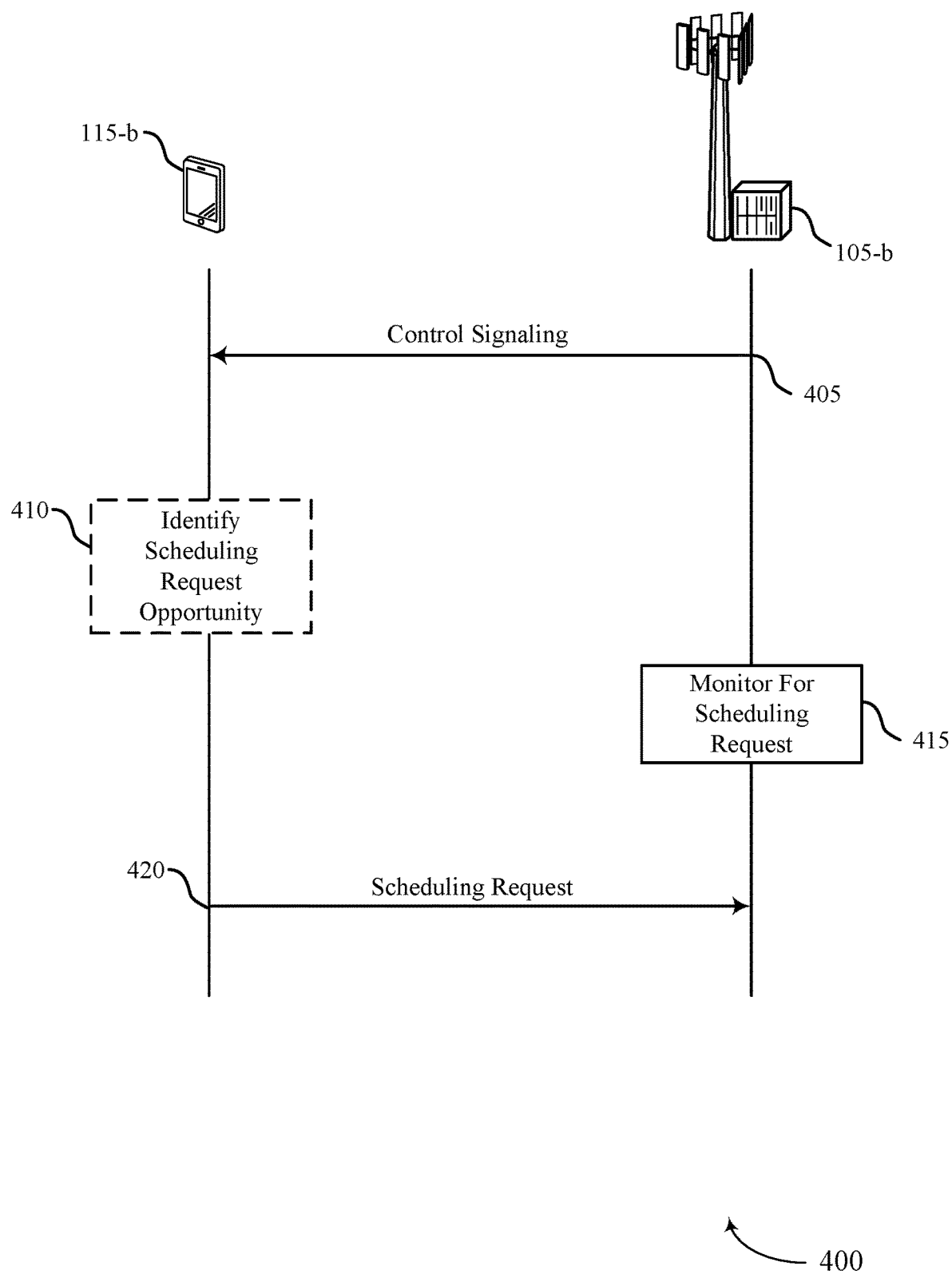
FIG. 4 illustrates an example of a process flow that supports techniques for counting a scheduling request periodicity in accordance with aspects of the present disclosure.

FIG. 4 illustrates an example of a process flow 400 that supports techniques for counting a scheduling request periodicity in accordance with aspects of the present disclosure. The process flow 400 may illustrate an example of techniques used by a communication system for counting a scheduling request offset and periodicity which may, for example, be implemented by a UE 115-b and a base station 105-b. For example, process flow 400 may support counting the offset and the periodicity using time periods that do not include downlink resources that conflict with a scheduling request opportunity, as described herein with reference to FIGS. 2 and 3, where base station 105-b and UE 115-b may be examples of the corresponding devices described with reference to FIGS. 1-3.

In the following description of process flow 400, the operations may be performed in a different order than the order shown, or the operations performed by UE 115-b and base station 105-b may be performed in different orders or at different times. For example, some operations may also be left out of process flow 400, or other operations may be added to process flow 400. As another example, operations shown as performed in a single instance (e.g., a single transmission) may in some cases be performed as multiple instances (e.g., multiple transmissions) over some duration of time, or multiple transmissions may be combined into a single transmission instance. Although UE 115-b and base station 105-b are shown performing the operations of process flow 400, some aspects of some operations may also be performed by one or more other wireless devices.

At 405, base station 105-b may transmit, to UE 115-b, control signaling indicating a periodicity and an offset applicable to transmission of scheduling requests from UE 115-b to base station 105-b. For example, base station 105-b may indicate the periodicity and the offset to UE 115-b via RRC signaling, as described herein.

At 410, in some cases, UE 115-b may identify one or more scheduling request opportunities for transmission of a scheduling request to base station 105-b. As described herein with reference to FIGS. 2 and 3, UE 115-b may apply the periodicity and the offset to a first subset of time periods of a set of multiple time periods, where the first subset may include resources for transmission of scheduling requests (e.g., resources for scheduling request opportunities) that do not overlap with resources allocated for downlink transmissions.

For example, UE 115-b may only apply the offset and the periodicity to time periods allocated for uplink transmissions, or to special time periods that include a first portion allocated for downlink transmissions and a second portion allocated for uplink transmissions, where the second portion overlaps with (e.g., completely overlaps with) resources for a scheduling request opportunity. UE 115-b may also refrain from applying the periodicity and the offset to a second subset of time periods, where the second subset may include time periods allocated for downlink transmissions, or special time periods that include at a first portion allocated for downlink transmissions and a second portion allocated for uplink transmissions, where the first portion overlaps with (e.g., at least partially overlaps with) resources for a scheduling request opportunity.

At 415, base station 105-b may monitor for a scheduling request from UE 115-b over one or more time periods of the first subset of time periods, for example, based on applying the periodicity and the offset to the first subset of time periods. For example, base station 105-b may determine the one or more time periods for monitoring by applying the periodicity and the offset to the first subset of time periods, as described herein (e.g., with respect to 410).

At 420, UE 115-b may transmit, to base station 105-b, a scheduling request over a first time period selected from the first subset of time periods. For example, UE 115-b may determine to request resources for an uplink transmission (e.g., based on a status of a buffer) and may identify a scheduling request opportunity within the first time period, based on identifying the one or more scheduling request opportunities at 410. UE 115-b may use the identified scheduling request opportunity to transmit the scheduling request. In some cases, the monitoring performed by base station 105-b may overlap with the transmission of the scheduling request, such that base station 105-b may receive the scheduling request based on the transmission thereof, and based on monitoring for the scheduling request.

Figure 5:
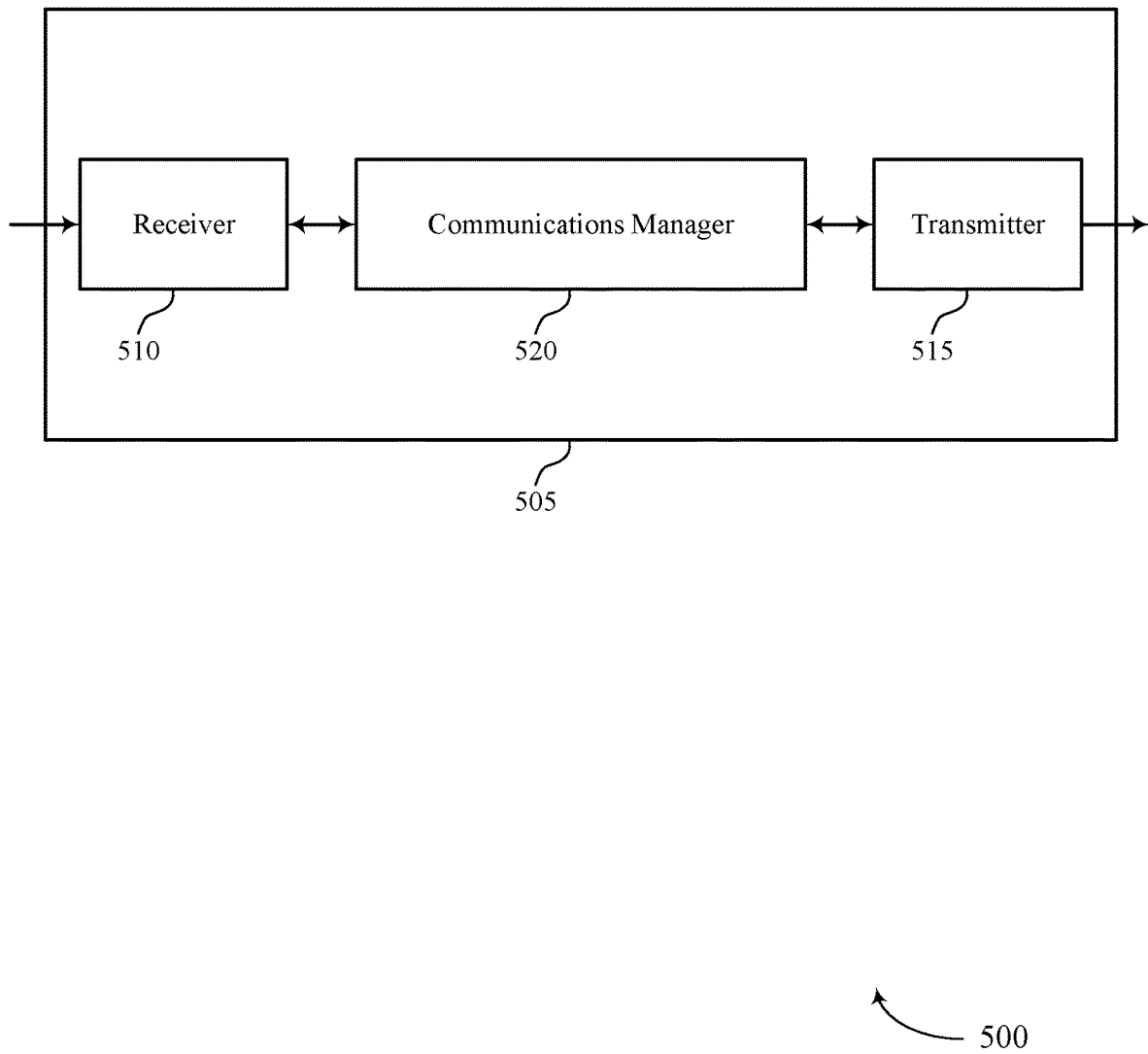
FIGS. 5 and 6 show block diagrams of devices that support techniques for counting a scheduling request periodicity in accordance with aspects of the present disclosure.

FIG. 5 shows a block diagram 500 of a device 505 that supports techniques for counting a scheduling request periodicity in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for counting a scheduling request periodicity). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for counting a scheduling request periodicity). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for counting a scheduling request periodicity as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, control signaling indicating a periodicity and an offset applicable to transmission of scheduling requests from the UE to the base station. The communications manager 520 may be configured as or otherwise support a means for transmitting a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period.

The actions performed by the communications manager 520, among other examples herein, may be implemented to realize one or more potential advantages. For example, communications manager 520 may increase available battery power and communication quality at a wireless device (e.g., a UE 115) by supporting transmission of scheduling request via uplink channel resources. The associated increase in communication quality may result in increased link performance and decreased overhead based on excluding resources for downlink transmissions when identifying resources for transmission of the scheduling request. Accordingly, communications manager 520 may save power and increase battery life at a wireless device (e.g., a UE 115) by strategically increasing a quality of communications at a wireless device (e.g., a UE 115).

Figure 6:
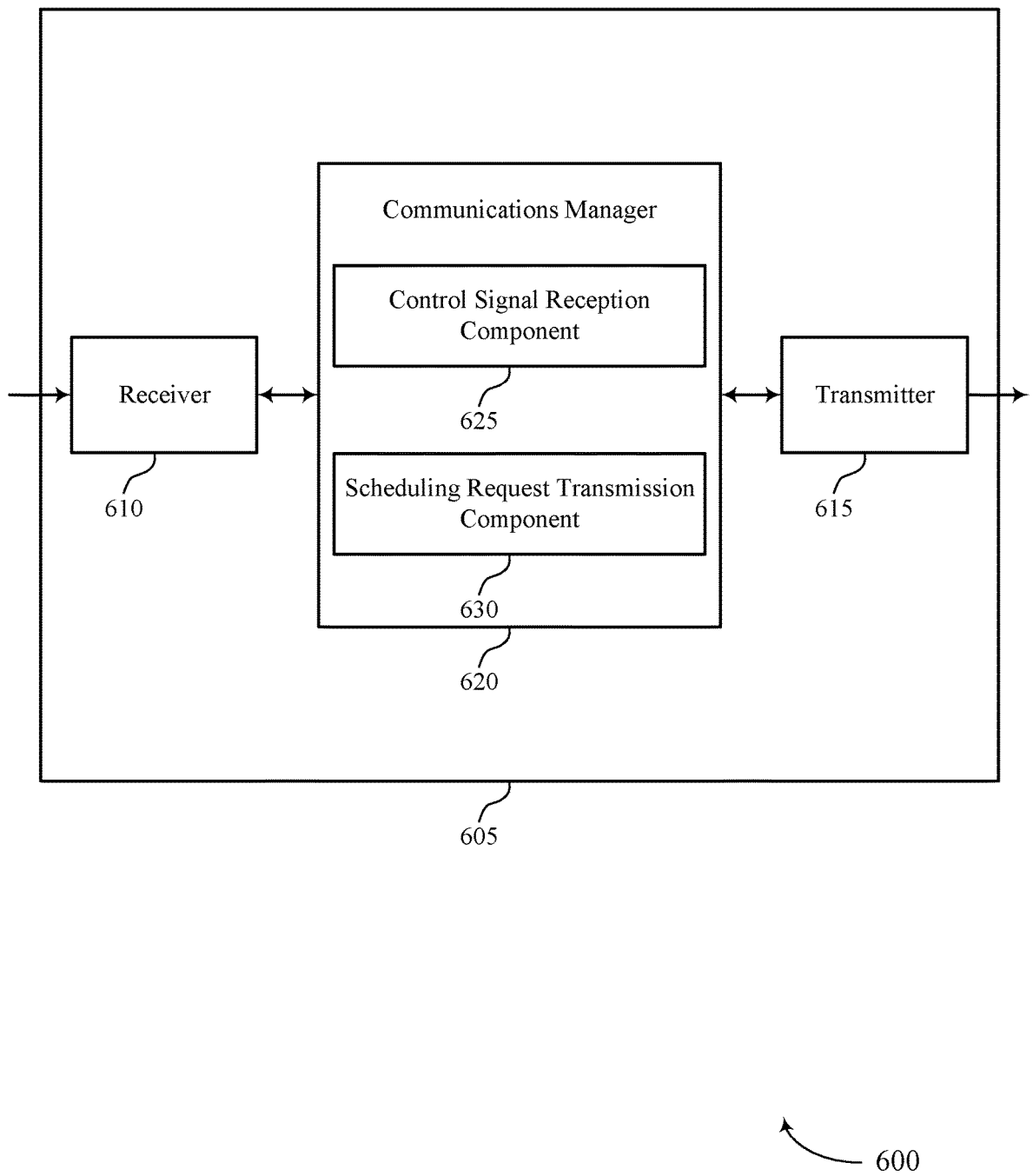

FIG. 6 shows a block diagram 600 of a device 605 that supports techniques for counting a scheduling request periodicity in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for counting a scheduling request periodicity). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for counting a scheduling request periodicity). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for counting a scheduling request periodicity as described herein. For example, the communications manager 620 may include a control signal reception component 625 a scheduling request transmission component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control signal reception component 625 may be configured as or otherwise support a means for receiving, from a base station, control signaling indicating a periodicity and an offset applicable to transmission of scheduling requests from the UE to the base station. The scheduling request transmission component 630 may be configured as or otherwise support a means for transmitting a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period.

A processor of a wireless device (e.g., controlling the receiver 610, the transmitter 615, or the transceiver 815 as described with reference to FIG. 8) may increase available battery power and communication quality. The increased communication quality may increase available battery power and throughput (e.g., via implementation of system components described with reference to FIG. 7) compared to other systems and techniques, for example, that do not support exclusion of resources for downlink transmissions when identifying resources for transmission of a scheduling request. Further, the processor of the wireless device may identify one or more aspects (e.g., parameters) of the resources for the scheduling request, which may result in increased communication quality, as well as save power and increase battery life at the wireless device (e.g., by strategically supporting an increased number of resources for transmission of scheduling requests), among other benefits.

Figure 7:
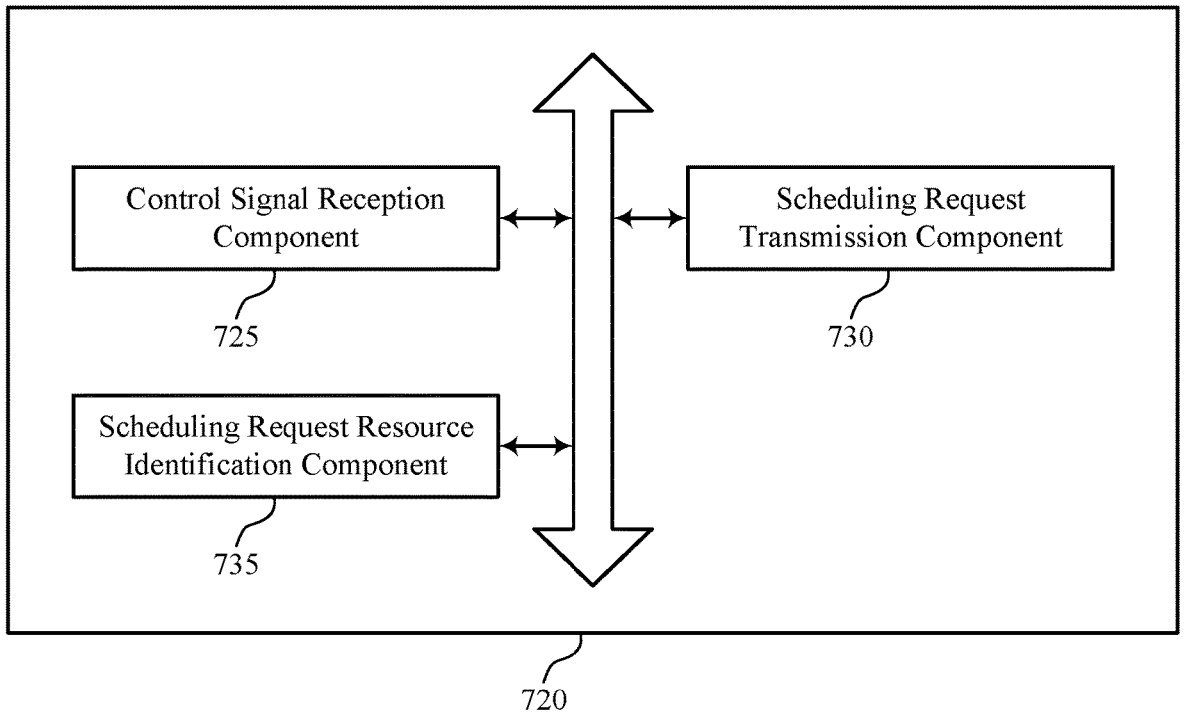
FIG. 7 shows a block diagram of a communications manager that supports techniques for counting a scheduling request periodicity in accordance with aspects of the present disclosure.

FIG. 7 shows a block diagram 700 of a communications manager 720 that supports techniques for counting a scheduling request periodicity in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for counting a scheduling request periodicity as described herein. For example, the communications manager 720 may include a control signal reception component 725, a scheduling request transmission component 730, a scheduling request resource identification component 735, or any combination thereof. Each of these components may communicate, directly or indirectly, with one another (e.g., via one or more buses).

The communications manager 720 may support wireless communication at a UE in accordance with examples as disclosed herein. The control signal reception component 725 may be configured as or otherwise support a means for receiving, from a base station, control signaling indicating a periodicity and an offset applicable to transmission of scheduling requests from the UE to the base station. The scheduling request transmission component 730 may be configured as or otherwise support a means for transmitting a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period.

In some examples, the scheduling request resource identification component 735 may be configured as or otherwise support a means for refraining from applying the periodicity and the offset to a second subset of time periods of the set of multiple time periods, where for the second subset of time periods the resources for transmission of scheduling requests at least partially overlap with resources allocated for downlink transmissions.

In some examples, the resources allocated for downlink transmissions for the second subset of time periods include one or more resources allocated for a downlink shared channel, a downlink control channel, a synchronization signal block transmission, a control resource set, or any combination thereof.

In some examples, the set of multiple time periods includes a second time period that includes a first portion allocated for downlink transmissions and a second portion allocated for uplink transmissions. In some examples, the second subset of time periods includes the second time period based on determining that the first portion allocated for downlink transmissions overlaps with one or more symbols for transmission of scheduling requests.

In some examples, the set of multiple time periods includes a third time period that includes a first portion allocated for downlink transmissions and a second portion allocated for uplink transmissions. In some examples, the first subset of time periods includes the third time period based on determining that the resources for transmission of scheduling requests overlap with a portion of the third time period allocated for uplink transmissions.

In some examples, the scheduling request resource identification component 735 may be configured as or otherwise support a means for determining a starting time period of the set of multiple time periods for applying the offset, the starting time period included in the first subset of time periods. In some examples, the scheduling request resource identification component 735 may be configured as or otherwise support a means for identifying a fourth time period of the set of multiple time periods that includes a first set of resources for transmission of scheduling requests based on applying the offset to the starting time period, the fourth time period included in the first subset of time periods, where transmitting the scheduling request is based on identifying the fourth time period.

In some examples, the scheduling request resource identification component 735 may be configured as or otherwise support a means for identifying a fifth time period of the set of multiple time periods that includes a fourth set of resources for transmission of scheduling requests based on applying the periodicity between the fourth time period and the fifth time period, the fifth time period included in the first subset of time periods.

In some examples, the control signal reception component 725 may be configured as or otherwise support a means for receiving control signaling indicating a second periodicity and a second offset applicable to transmission of scheduling requests from the UE to the base station, where the periodicity and the offset are applicable to a first configuration for the set of multiple time periods and the second periodicity and the second offset are applicable to a second configuration for the set of multiple time periods.

In some examples, each of the set of multiple time periods corresponds to a respective slot. In some examples, each of the set of multiple time periods corresponds to a respective symbol.

Figure 8:
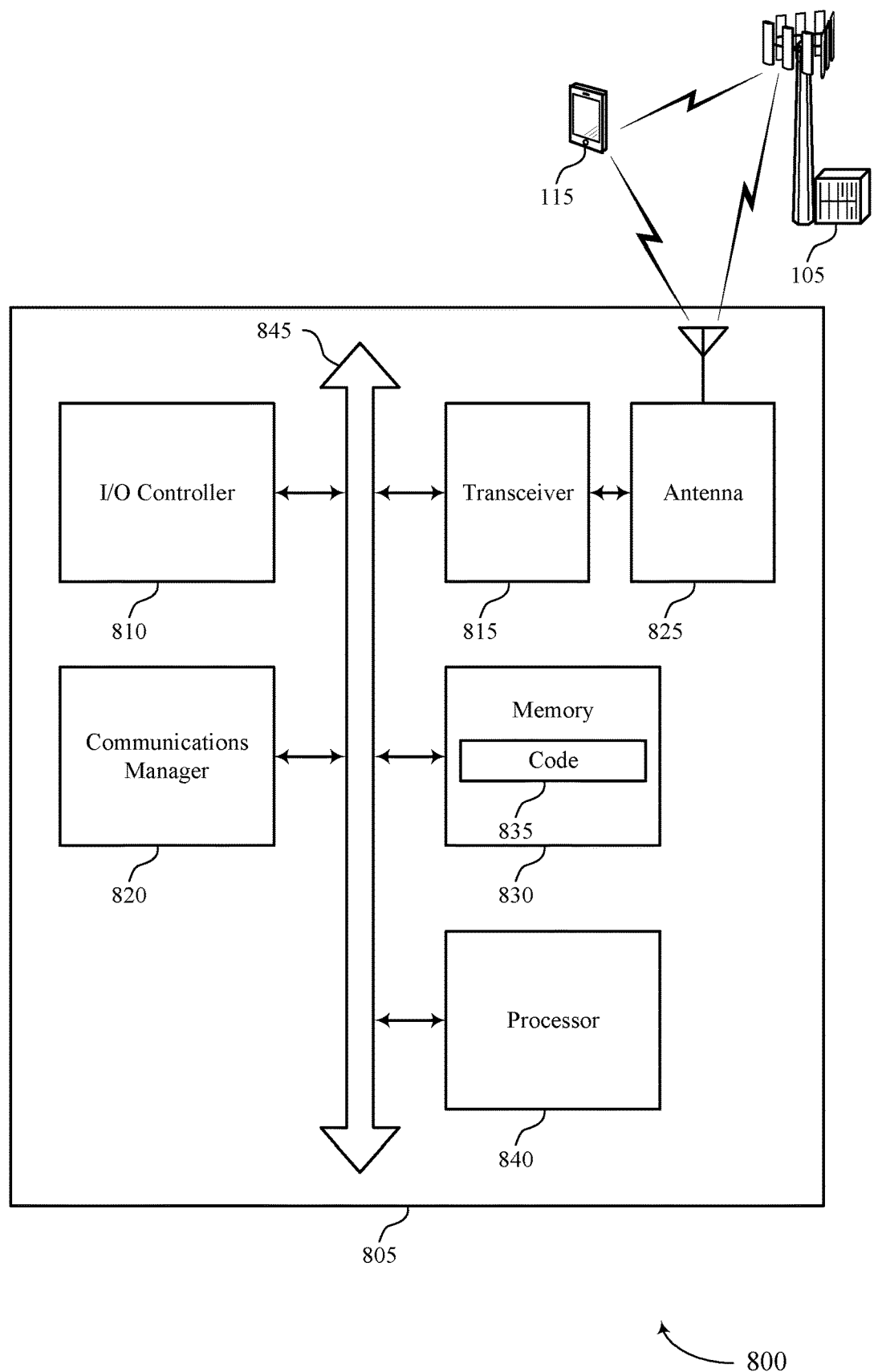
FIG. 8 shows a diagram of a system including a device that supports techniques for counting a scheduling request periodicity in accordance with aspects of the present disclosure.

FIG. 8 shows a diagram of a system 800 including a device 805 that supports techniques for counting a scheduling request periodicity in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for counting a scheduling request periodicity). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, control signaling indicating a periodicity and an offset applicable to transmission of scheduling requests from the UE to the base station. The communications manager 820 may be configured as or otherwise support a means for transmitting a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for counting a scheduling request periodicity as described herein, or the processor 840 and the memory 830 may be otherwise configured to perform or support such operations.

Figure 9:
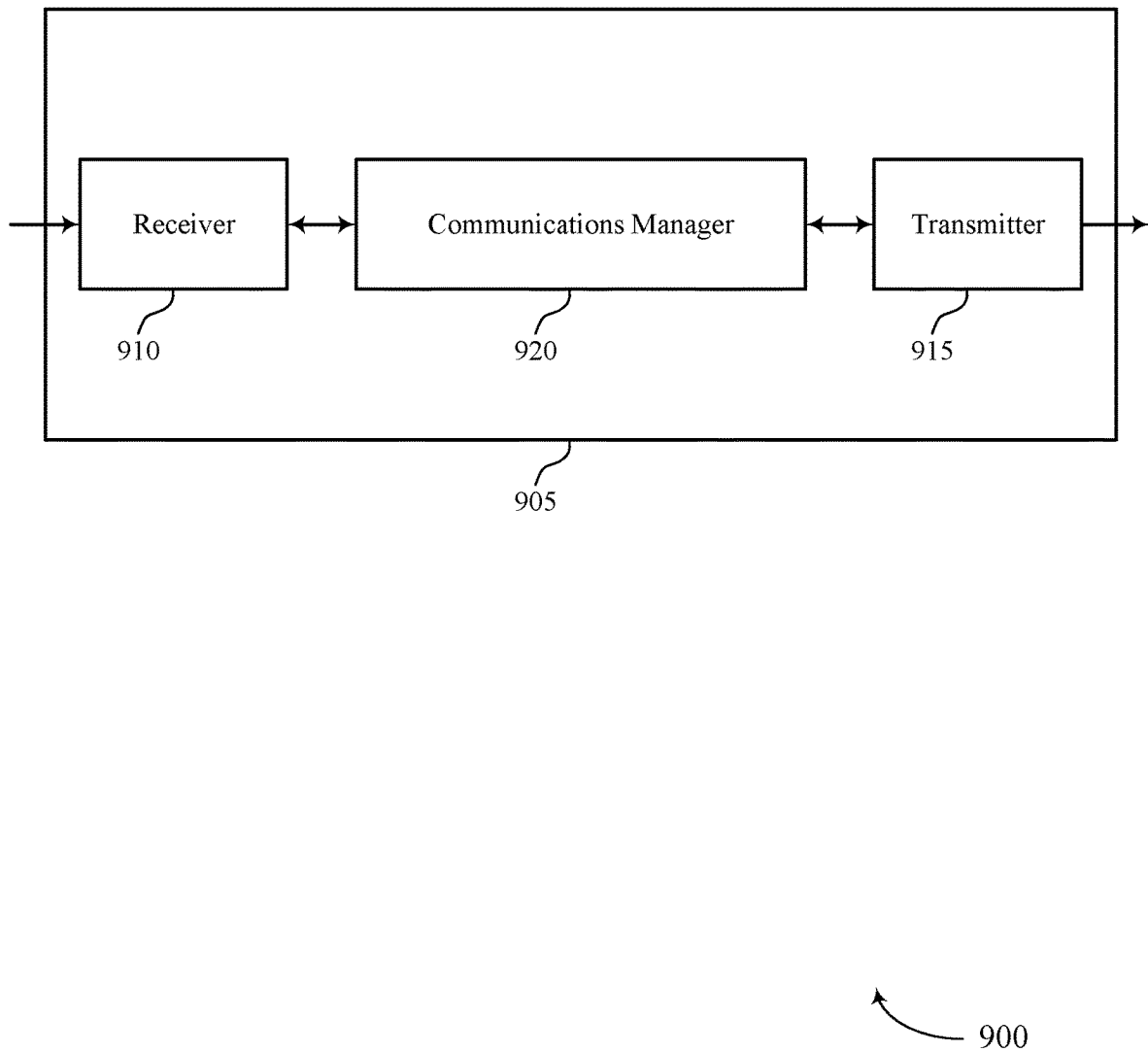
FIGS. 9 and 10 show block diagrams of devices that support techniques for counting a scheduling request periodicity in accordance with aspects of the present disclosure.

FIG. 9 shows a block diagram 900 of a device 905 that supports techniques for counting a scheduling request periodicity in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for counting a scheduling request periodicity). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for counting a scheduling request periodicity). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for counting a scheduling request periodicity as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, control signaling indicating a periodicity and an offset applicable to transmission of scheduling requests from the UE to the base station. The communications manager 920 may be configured as or otherwise support a means for monitoring for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions.

Figure 10:
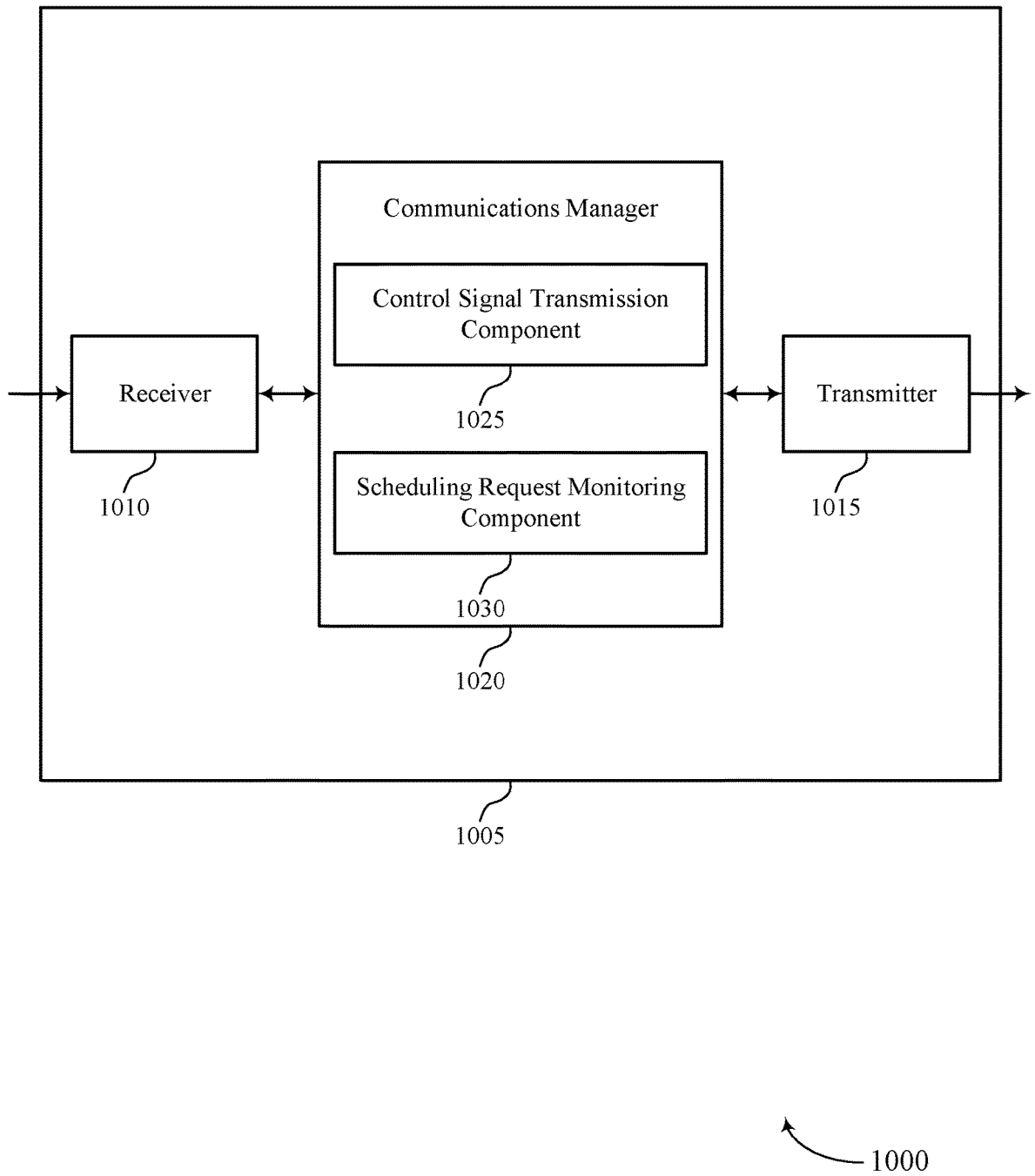

FIG. 10 shows a block diagram 1000 of a device 1005 that supports techniques for counting a scheduling request periodicity in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for counting a scheduling request periodicity). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for counting a scheduling request periodicity). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for counting a scheduling request periodicity as described herein. For example, the communications manager 1020 may include a control signal transmission component 1025 a scheduling request monitoring component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The control signal transmission component 1025 may be configured as or otherwise support a means for transmitting, to a UE, control signaling indicating a periodicity and an offset applicable to transmission of scheduling requests from the UE to the base station. The scheduling request monitoring component 1030 may be configured as or otherwise support a means for monitoring for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions.

Figure 11:
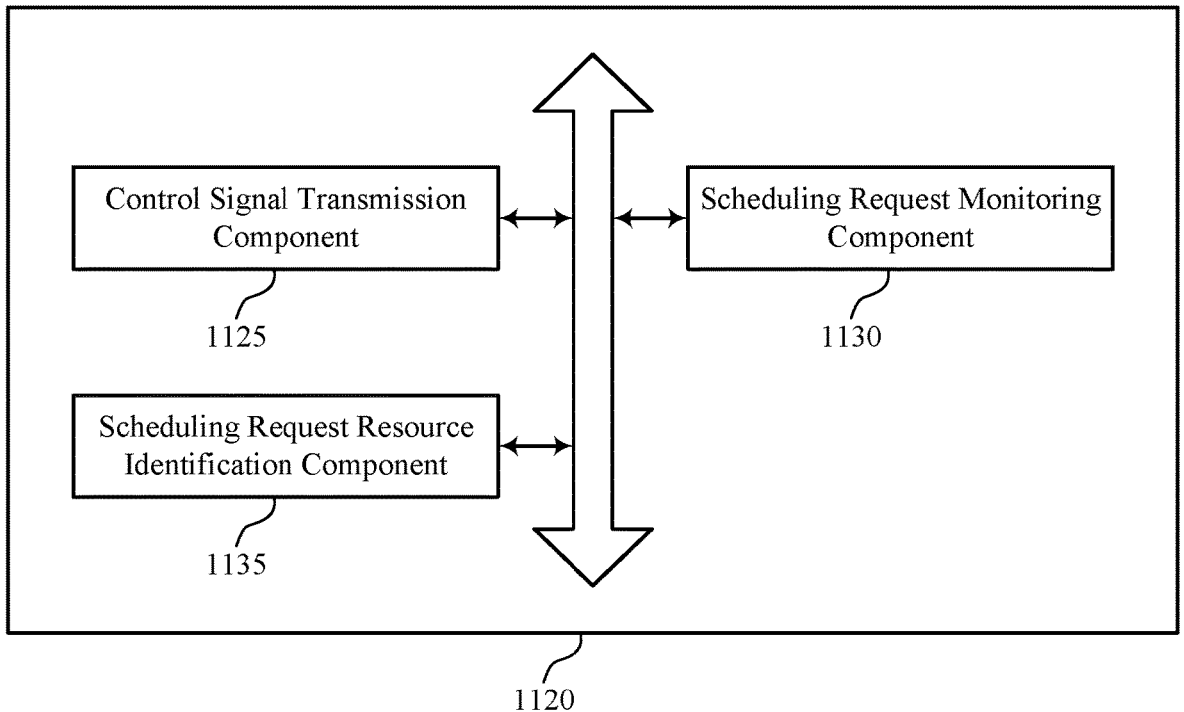
FIG. 11 shows a block diagram of a communications manager that supports techniques for counting a scheduling request periodicity in accordance with aspects of the present disclosure.

FIG. 11 shows a block diagram 1100 of a communications manager 1120 that supports techniques for counting a scheduling request periodicity in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for counting a scheduling request periodicity as described herein. For example, the communications manager 1120 may include a control signal transmission component 1125, a scheduling request monitoring component 1130, a scheduling request resource identification component 1135, or any combination thereof. Each of these components may communicate, directly or indirectly, with one another (e.g., via one or more buses).

The communications manager 1120 may support wireless communication at a base station in accordance with examples as disclosed herein. The control signal transmission component 1125 may be configured as or otherwise support a means for transmitting, to a UE, control signaling indicating a periodicity and an offset applicable to transmission of scheduling requests from the UE to the base station. The scheduling request monitoring component 1130 may be configured as or otherwise support a means for monitoring for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions.

In some examples, the scheduling request resource identification component 1135 may be configured as or otherwise support a means for refraining from applying the periodicity and the offset to a second subset of time periods of the set of multiple time periods, where for the second subset of time periods the resources for transmission of scheduling requests at least partially overlap with resources allocated for downlink transmissions.

In some examples, the resources allocated for downlink transmissions for the second subset of time periods include one or more resources allocated for a downlink shared channel, a downlink control channel, a synchronization signal block transmission, a control resource set, or any combination thereof.

In some examples, the set of multiple time periods includes a second time period that includes a first portion allocated for downlink transmissions and a second portion allocated for uplink transmissions. In some examples, the second subset of time periods includes the second time period based on determining that the first portion allocated for downlink transmissions overlaps with one or more symbols for transmission of scheduling requests.

In some examples, the set of multiple time periods includes a third time period that includes a first portion allocated for downlink transmissions and a second portion allocated for uplink transmissions. In some examples, the first subset of time periods includes the third time period based on determining that the resources for transmission of scheduling requests overlap with a portion of the third time period allocated for uplink transmissions.

In some examples, the scheduling request resource identification component 1135 may be configured as or otherwise support a means for determining a starting time period of the set of multiple time periods for applying the offset, the starting time period included in the first subset of time periods. In some examples, the scheduling request resource identification component 1135 may be configured as or otherwise support a means for identifying a fourth time period of the set of multiple time periods that includes a first set of resources for transmission of scheduling requests based on applying the offset to the starting time period, the fourth time period included in the first subset of time periods, where monitoring for the scheduling request is based on identifying the fourth time period.

In some examples, the scheduling request resource identification component 1135 may be configured as or otherwise support a means for identifying a fifth time period of the set of multiple time periods that includes a fourth set of resources for transmission of scheduling requests based on applying the periodicity between the fourth time period and the fifth time period, the fifth time period included in the first subset of time periods.

In some examples, the control signal transmission component 1125 may be configured as or otherwise support a means for transmitting control signaling indicating a second periodicity and a second offset applicable to transmission of scheduling requests from the UE to the base station, where the periodicity and the offset are applicable to a first configuration for the set of multiple time periods and the second periodicity and the second offset are applicable to a second configuration for the set of multiple time periods.

In some examples, each of the set of multiple time periods corresponds to a respective slot.

In some examples, each of the set of multiple time periods corresponds to a respective symbol.

Figure 12:
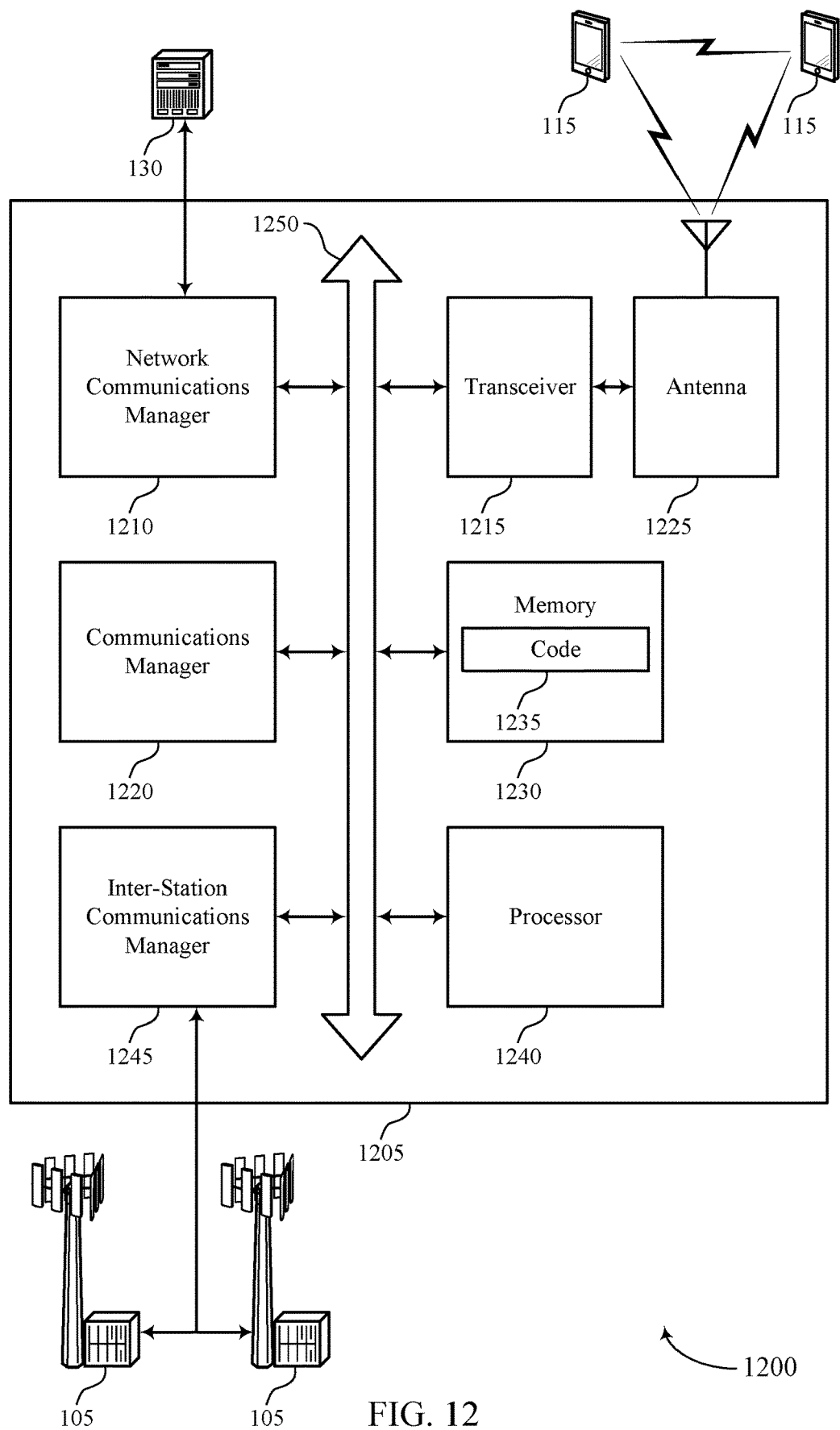
FIG. 12 shows a diagram of a system including a device that supports techniques for counting a scheduling request periodicity in accordance with aspects of the present disclosure.

FIG. 12 shows a diagram of a system 1200 including a device 1205 that supports techniques for counting a scheduling request periodicity in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for counting a scheduling request periodicity). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, control signaling indicating a periodicity and an offset applicable to transmission of scheduling requests from the UE to the base station. The communications manager 1220 may be configured as or otherwise support a means for monitoring for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for counting a scheduling request periodicity as described herein, or the processor 1240 and the memory 1230 may be otherwise configured to perform or support such operations.

Figure 13:
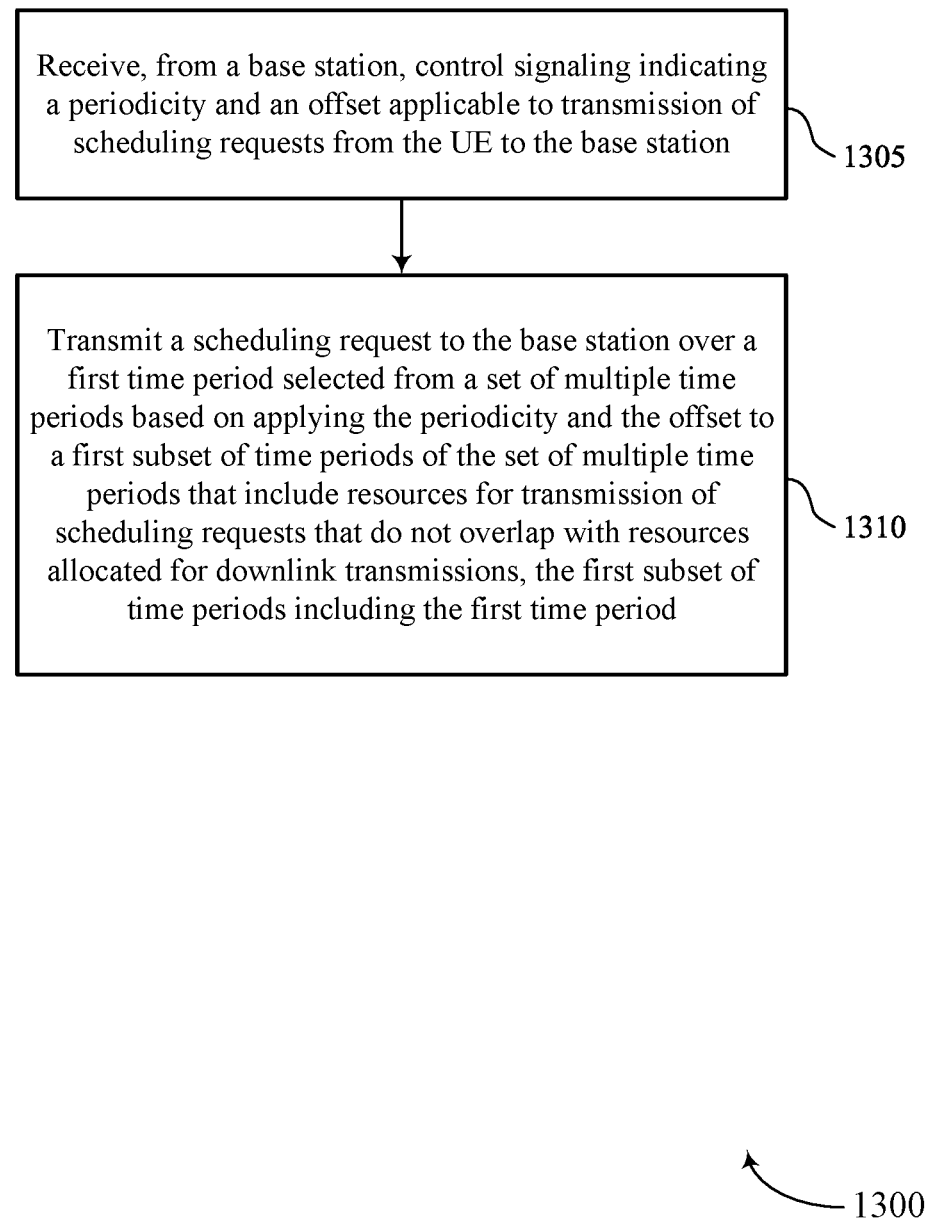
FIGS. 13 through 16 show flowcharts illustrating methods that support techniques for counting a scheduling request periodicity in accordance with aspects of the present disclosure.

FIG. 13 shows a flowchart illustrating a method 1300 that supports techniques for counting a scheduling request periodicity in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating a periodicity and an offset applicable to transmission of scheduling requests from the UE to the base station. The operations of 1305 may be performed in accordance with examples as disclosed herein. In some examples, aspects of the operations of 1305 may be performed by a control signal reception component 725 as described with reference to FIG. 7.

At 1310, the method may include transmitting a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period. The operations of 1310 may be performed in accordance with examples as disclosed herein. In some examples, aspects of the operations of 1310 may be performed by a scheduling request transmission component 730 as described with reference to FIG. 7.

Figure 14:
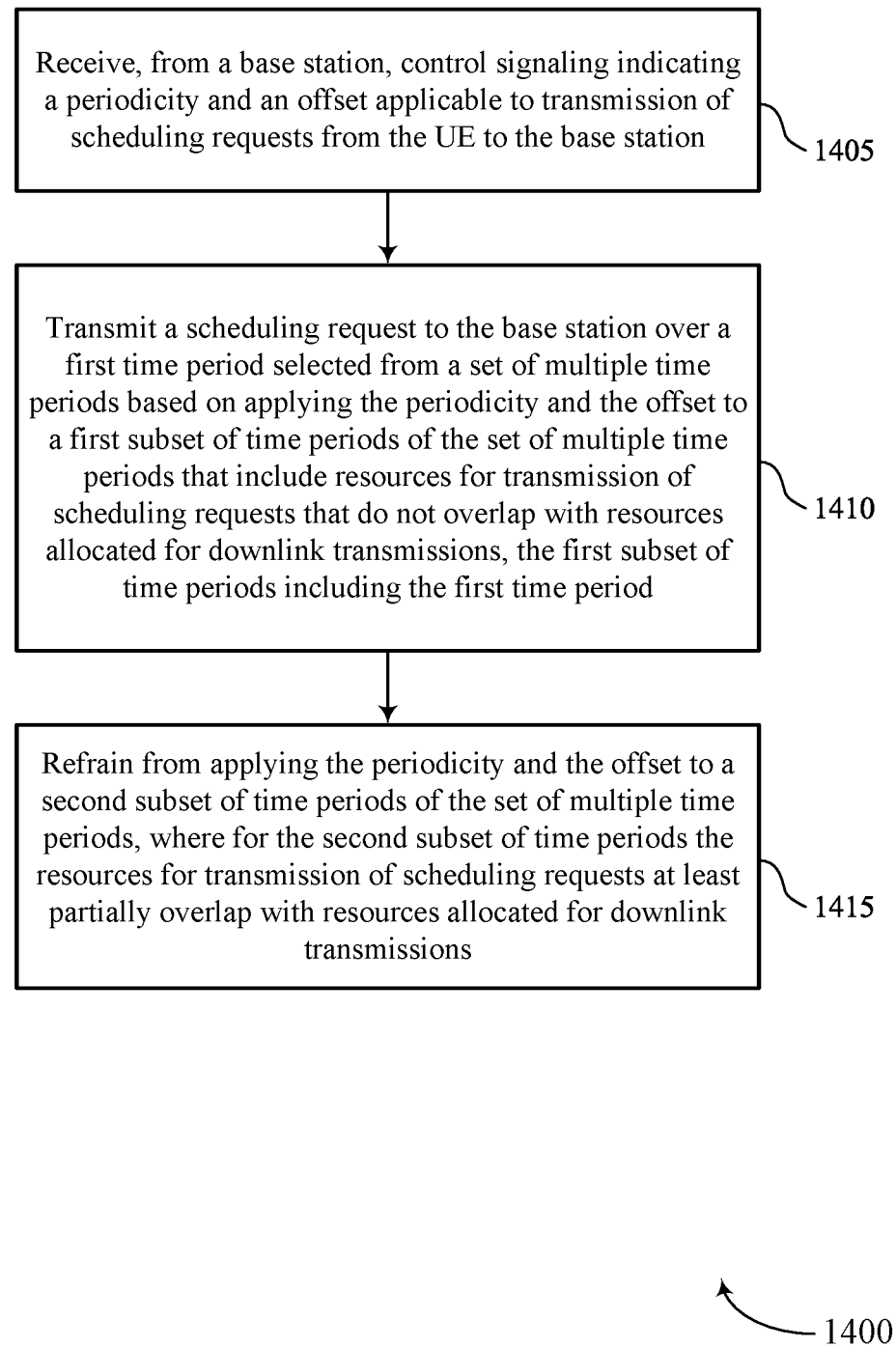

FIG. 14 shows a flowchart illustrating a method 1400 that supports techniques for counting a scheduling request periodicity in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating a periodicity and an offset applicable to transmission of scheduling requests from the UE to the base station. The operations of 1405 may be performed in accordance with examples as disclosed herein. In some examples, aspects of the operations of 1405 may be performed by a control signal reception component 725 as described with reference to FIG. 7.

At 1410, the method may include transmitting a scheduling request to the base station over a first time period selected from a set of multiple time periods based on applying the periodicity and the offset to a first subset of time periods of the set of multiple time periods that include resources for transmission of scheduling requests that do not overlap with resources allocated for downlink transmissions, the first subset of time periods including the first time period. The operations of 1410 may be performed in accordance with examples as disclosed herein. In some examples, aspects of the operations of 1410 may be performed by a scheduling request transmission component 730 as described with reference to FIG. 7.

At 1415, the method may include refraining from applying the periodicity and the offset to a second subset of time periods of the set of multiple time periods, where for the second subset of time periods the resources for transmission of scheduling requests at least partially overlap with resources allocated for downlink transmissions. The operations of 1415 may be performed in accordance with examples as disclosed herein. In some examples, aspects of the operations of 1415 may be performed by a scheduling request resource identification component 735 as described with reference to FIG. 7.

Figure 15:
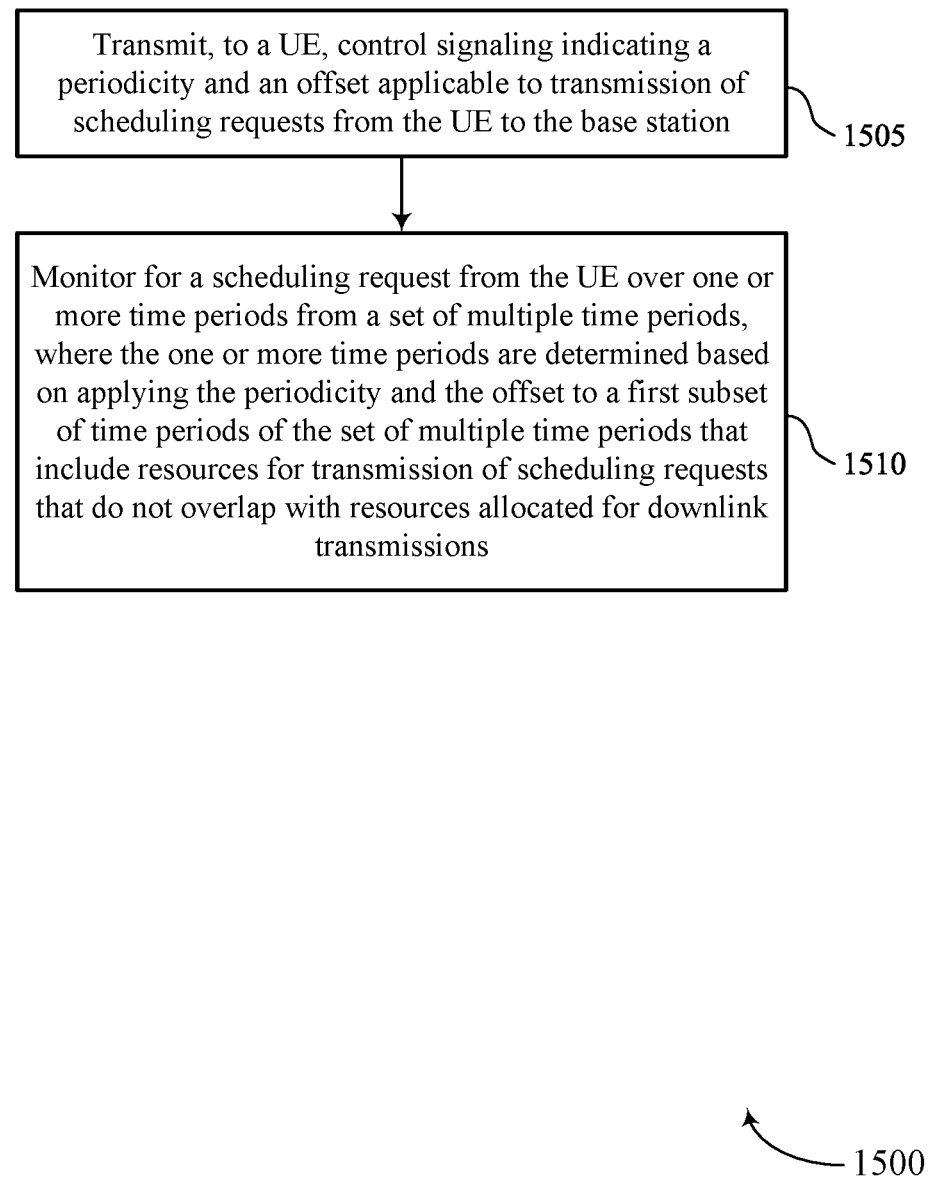

FIG. 15 shows a flowchart illustrating a method 1500 that supports techniques for counting a scheduling request periodicity in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling indicating a periodicity and an offset applicable to transmission of scheduling requests from the UE to the base station. The operations of 1505 may be performed in accordance with examples as disclosed herein. In some examples, aspects of the operations of 1505 may be performed by a control signal transmission component 1125 as described with reference to FIG. 11.

At 1510, the method may include monitoring for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions. The operations of 1510 may be performed in accordance with examples as disclosed herein. In some examples, aspects of the operations of 1510 may be performed by a scheduling request monitoring component 1130 as described with reference to FIG. 11.

Figure 16:
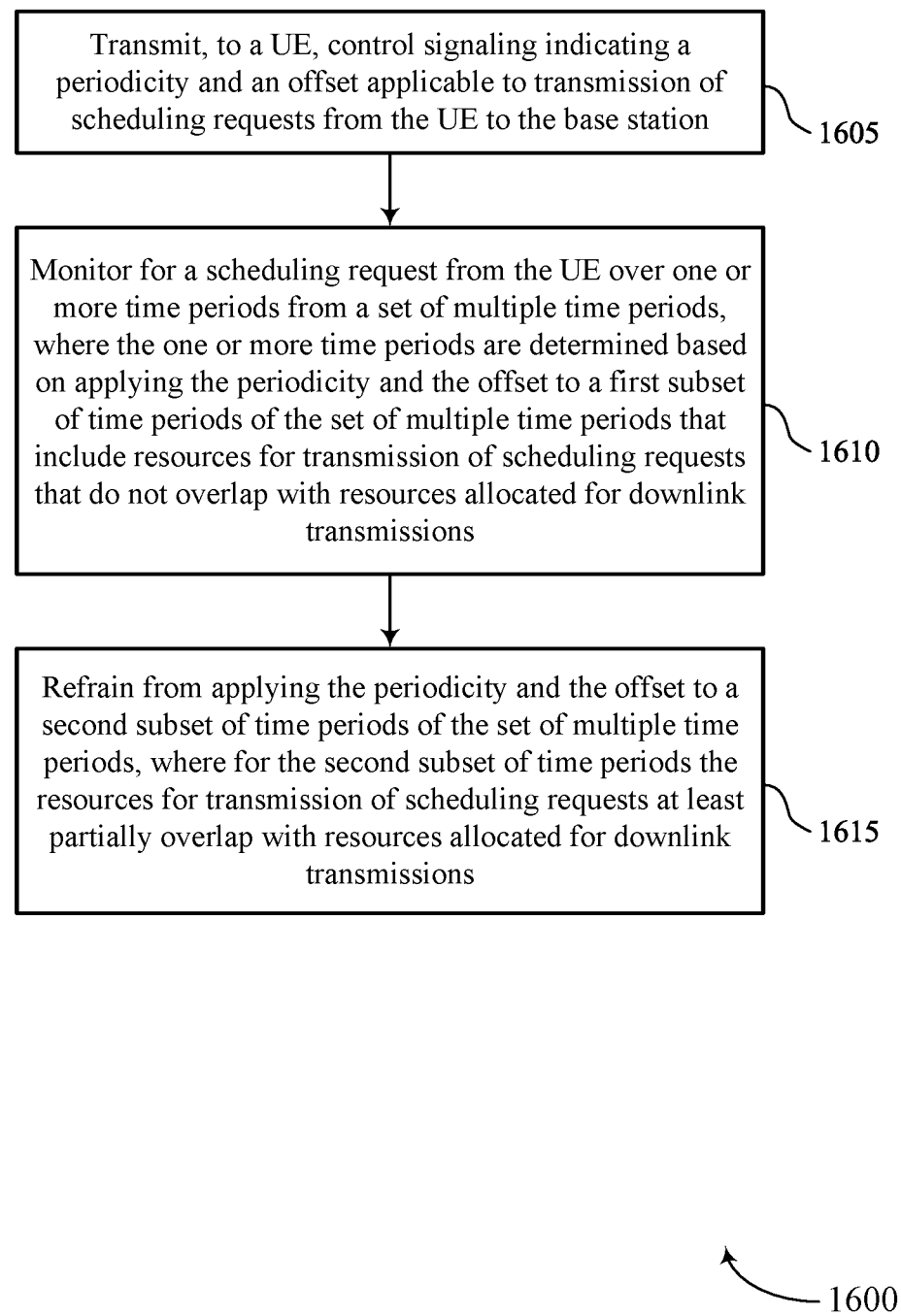

FIG. 16 shows a flowchart illustrating a method 1600 that supports techniques for counting a scheduling request periodicity in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling indicating a periodicity and an offset applicable to transmission of scheduling requests from the UE to the base station. The operations of 1605 may be performed in accordance with examples as disclosed herein. In some examples, aspects of the operations of 1605 may be performed by a control signal transmission component 1125 as described with reference to FIG. 11.

At 1610, the method may include monitoring for a scheduling request from the UE over one or more time periods from a set of multiple time periods, where the one or more time periods are determined based on applying the periodicity and the offset to a first subset of time periods of the set of multiple time periods that include resources for transmission of scheduling requests that do not overlap with resources allocated for downlink transmissions. The operations of 1610 may be performed in accordance with examples as disclosed herein. In some examples, aspects of the operations of 1610 may be performed by a scheduling request monitoring component 1130 as described with reference to FIG. 11.

At 1615, the method may include refraining from applying the periodicity and the offset to a second subset of time periods of the set of multiple time periods, where for the second subset of time periods the resources for transmission of scheduling requests at least partially overlap with resources allocated for downlink transmissions. The operations of 1615 may be performed in accordance with examples as disclosed herein. In some examples, aspects of the operations of 1615 may be performed by a scheduling request resource identification component 1135 as described with reference to FIG. 11.

The following provides an overview of aspects of the present disclosure:

Aspect 1: A method for wireless communication at a UE, comprising: receiving, from a base station, control signaling indicating a periodicity and an offset applicable to transmission of scheduling requests from the UE to the base station; and transmitting a scheduling request to the base station over a first time period selected from a plurality of time periods based at least in part on applying the periodicity and the offset to a first subset of time periods of the plurality of time periods that include resources for transmission of scheduling requests that do not overlap with resources allocated for downlink transmissions, the first subset of time periods comprising the first time period.

Aspect 2: The method of aspect 1, further comprising: refraining from applying the periodicity and the offset to a second subset of time periods of the plurality of time periods, wherein for the second subset of time periods the resources for transmission of scheduling requests at least partially overlap with resources allocated for downlink transmissions.

Aspect 3: The method of aspect 2, wherein the resources allocated for downlink transmissions for the second subset of time periods comprise one or more resources allocated for a downlink shared channel, a downlink control channel, a synchronization signal block transmission, a control resource set, or any combination thereof.

Aspect 4: The method of any of aspects 2 through 3, wherein the plurality of time periods comprises a second time period that includes a first portion allocated for downlink transmissions and a second portion allocated for uplink transmissions, and the second subset of time periods comprises the second time period based at least in part on determining that the first portion allocated for downlink transmissions overlaps with one or more symbols for transmission of scheduling requests.

Aspect 5: The method of any of aspects 2 through 4, wherein the plurality of time periods comprises a third time period that includes a first portion allocated for downlink transmissions and a second portion allocated for uplink transmissions, and the first subset of time periods comprises the third time period based at least in part on determining that the resources for transmission of scheduling requests overlap with a portion of the third time period allocated for uplink transmissions.

Aspect 6: The method of any of aspects 1 through 5, further comprising: determining a starting time period of the plurality of time periods for applying the offset, the starting time period included in the first subset of time periods; and identifying a fourth time period of the plurality of time periods that comprises a first set of resources for transmission of scheduling requests based at least in part on applying the offset to the starting time period, the fourth time period included in the first subset of time periods, wherein transmitting the scheduling request is based at least in part on identifying the fourth time period.

Aspect 7: The method of aspect 6, further comprising: identifying a fifth time period of the plurality of time periods that comprises a fourth set of resources for transmission of scheduling requests based at least in part on applying the periodicity between the fourth time period and the fifth time period, the fifth time period included in the first subset of time periods.

Aspect 8: The method of any of aspects 1 through 7, further comprising: receiving control signaling indicating a second periodicity and a second offset applicable to transmission of scheduling requests from the UE to the base station, wherein the periodicity and the offset are applicable to a first configuration for the plurality of time periods and the second periodicity and the second offset are applicable to a second configuration for the plurality of time periods.

Aspect 9: The method of any of aspects 1 through 8, wherein each of the plurality of time periods corresponds to a respective slot.

Aspect 10: The method of any of aspects 1 through 9, wherein each of the plurality of time periods corresponds to a respective symbol.

Aspect 11: A method for wireless communication at a base station, comprising: transmitting, to a UE, control signaling indicating a periodicity and an offset applicable to transmission of scheduling requests from the UE to the base station; and monitoring for a scheduling request from the UE over one or more time periods from a plurality of time periods, wherein the one or more time periods are determined based at least in part on applying the periodicity and the offset to a first subset of time periods of the plurality of time periods that include resources for transmission of scheduling requests that do not overlap with resources allocated for downlink transmissions.

Aspect 12: The method of aspect 11, further comprising: refraining from applying the periodicity and the offset to a second subset of time periods of the plurality of time periods, wherein for the second subset of time periods the resources for transmission of scheduling requests at least partially overlap with resources allocated for downlink transmissions.

Aspect 13: The method of aspect 12, wherein the resources allocated for downlink transmissions for the second subset of time periods comprise one or more resources allocated for a downlink shared channel, a downlink control channel, a synchronization signal block transmission, a control resource set, or any combination thereof.

Aspect 14: The method of any of aspects 12 through 13, wherein the plurality of time periods comprises a second time period that includes a first portion allocated for downlink transmissions and a second portion allocated for uplink transmissions, and the second subset of time periods comprises the second time period based at least in part on determining that the first portion allocated for downlink transmissions overlaps with one or more symbols for transmission of scheduling requests.

Aspect 15: The method of any of aspects 11 through 14, wherein the plurality of time periods comprises a third time period that includes a first portion allocated for downlink transmissions and a second portion allocated for uplink transmissions, and the first subset of time periods comprises the third time period based at least in part on determining that the resources for transmission of scheduling requests overlap with a portion of the third time period allocated for uplink transmissions.

Aspect 16: The method of any of aspects 11 through 15, further comprising: determining a starting time period of the plurality of time periods for applying the offset, the starting time period included in the first subset of time periods; and identifying a fourth time period of the plurality of time periods that comprises a first set of resources for transmission of scheduling requests based at least in part on applying the offset to the starting time period, the fourth time period included in the first subset of time periods, wherein monitoring for the scheduling request is based at least in part on identifying the fourth time period.

Aspect 17: The method of aspect 16, further comprising: identifying a fifth time period of the plurality of time periods that comprises a fourth set of resources for transmission of scheduling requests based at least in part on applying the periodicity between the fourth time period and the fifth time period, the fifth time period included in the first subset of time periods.

Aspect 18: The method of any of aspects 11 through 17, further comprising: transmitting control signaling indicating a second periodicity and a second offset applicable to transmission of scheduling requests from the UE to the base station, wherein the periodicity and the offset are applicable to a first configuration for the plurality of time periods and the second periodicity and the second offset are applicable to a second configuration for the plurality of time periods.

Aspect 19: The method of any of aspects 11 through 18, wherein each of the plurality of time periods corresponds to a respective slot.

Aspect 20: The method of any of aspects 11 through 19, wherein each of the plurality of time periods corresponds to a respective symbol.

Aspect 21: An apparatus for wireless communication at a UE, comprising a processor; memory coupled with the processor; and instructions stored in the memory and executable by the processor to cause the apparatus to perform a method of any of aspects 1 through 10.

Aspect 22: An apparatus for wireless communication at a UE, comprising at least one means for performing a method of any of aspects 1 through 10.

Aspect 23: A non-transitory computer-readable medium storing code for wireless communication at a UE, the code comprising instructions executable by a processor to perform a method of any of aspects 1 through 10.

Aspect 24: An apparatus for wireless communication at a base station, comprising a processor; memory coupled with the processor; and instructions stored in the memory and executable by the processor to cause the apparatus to perform a method of any of aspects 11 through 20.

Aspect 25: An apparatus for wireless communication at a base station, comprising at least one means for performing a method of any of aspects 11 through 20.

Aspect 26: A non-transitory computer-readable medium storing code for wireless communication at a base station, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, control signaling indicating a periodicity and an offset applicable to transmission of scheduling requests from the UE to the base station; and
   transmitting a scheduling request to the base station over a first time period selected from a plurality of time periods based at least in part on applying the periodicity and the offset to a first subset of time periods of the plurality of time periods that include resources for transmission of scheduling requests that do not overlap with resources allocated for downlink transmissions, wherein applying the periodicity comprises counting the periodicity and the offset with respect to time periods of the first subset of time periods, the first subset of time periods comprising the first time period.

2. The method of claim 1, further comprising:
   refraining from applying the periodicity and the offset to a second subset of time periods of the plurality of time periods, wherein for the second subset of time periods the resources for transmission of scheduling requests at least partially overlap with resources allocated for downlink transmissions.

3. The method of claim 2, wherein the resources allocated for downlink transmissions for the second subset of time periods comprise one or more resources allocated for a downlink shared channel, a downlink control channel, a synchronization signal block transmission, a control resource set, or any combination thereof.

4. The method of claim 2, wherein the plurality of time periods comprises a second time period that includes a first portion allocated for downlink transmissions and a second portion allocated for uplink transmissions, and wherein the second subset of time periods comprises the second time period based at least in part on determining that the first portion allocated for downlink transmissions overlaps with one or more symbols for transmission of scheduling requests.

5. The method of claim 2, wherein the plurality of time periods comprises a third time period that includes a first portion allocated for downlink transmissions and a second portion allocated for uplink transmissions, and wherein the first subset of time periods comprises the third time period based at least in part on determining that the resources for transmission of scheduling requests overlap with a portion of the third time period allocated for uplink transmissions.

6. The method of claim 1, further comprising:
determining a starting time period of the plurality of time periods for applying the offset, the starting time period included in the first subset of time periods; and
identifying a fourth time period of the plurality of time periods that comprises a first set of resources for transmission of scheduling requests based at least in part on applying the offset to the starting time period, the fourth time period included in the first subset of time periods, wherein transmitting the scheduling request is based at least in part on identifying the fourth time period.

7. The method of claim 6, further comprising:
identifying a fifth time period of the plurality of time periods that comprises a fourth set of resources for transmission of scheduling requests based at least in part on applying the periodicity between the fourth time period and the fifth time period, the fifth time period included in the first subset of time periods.

8. The method of claim 1, further comprising:
receiving control signaling indicating a second periodicity and a second offset applicable to transmission of scheduling requests from the UE to the base station, wherein the periodicity and the offset are applicable to a first configuration for the plurality of time periods and the second periodicity and the second offset are applicable to a second configuration for the plurality of time periods.

9. The method of claim 1, wherein the plurality of time periods corresponds to a plurality of slots, each time period of the plurality of time periods corresponding to a respective slot of the plurality of slots.

10. The method of claim 1, wherein each of the plurality of time periods corresponds to a respective symbol.

11. A method for wireless communication at a base station, comprising:
transmitting, to a user equipment (UE), control signaling indicating a periodicity and an offset applicable to transmission of scheduling requests from the UE to the base station; and
monitoring for a scheduling request from the UE over one or more time periods from a plurality of time periods, wherein the one or more time periods are determined based at least in part on applying the periodicity and the offset to a first subset of time periods of the plurality of time periods that include resources for transmission of scheduling requests that do not overlap with resources allocated for downlink transmissions, wherein applying the periodicity comprises counting the periodicity and the offset with respect to time periods of the first subset of time periods.

12. The method of claim 11, further comprising:
refraining from applying the periodicity and the offset to a second subset of time periods of the plurality of time periods, wherein for the second subset of time periods the resources for transmission of scheduling requests at least partially overlap with resources allocated for downlink transmissions.

13. The method of claim 12, wherein the resources allocated for downlink transmissions for the second subset of time periods comprise one or more resources allocated for a downlink shared channel, a downlink control channel, a synchronization signal block transmission, a control resource set, or any combination thereof.

14. The method of claim 12, wherein the plurality of time periods comprises a second time period that includes a first portion allocated for downlink transmissions and a second portion allocated for uplink transmissions, and wherein the second subset of time periods comprises the second time period based at least in part on determining that the first portion allocated for downlink transmissions overlaps with one or more symbols for transmission of scheduling requests.

15. The method of claim 11, wherein the plurality of time periods comprises a third time period that includes a first portion allocated for downlink transmissions and a second portion allocated for uplink transmissions, and wherein the first subset of time periods comprises the third time period based at least in part on determining that the resources for transmission of scheduling requests overlap with a portion of the third time period allocated for uplink transmissions.

16. The method of claim 11, further comprising:
determining a starting time period of the plurality of time periods for applying the offset, the starting time period included in the first subset of time periods; and
identifying a fourth time period of the plurality of time periods that comprises a first set of resources for transmission of scheduling requests based at least in part on applying the offset to the starting time period, the fourth time period included in the first subset of time periods, wherein monitoring for the scheduling request is based at least in part on identifying the fourth time period.

17. The method of claim 16, further comprising:
identifying a fifth time period of the plurality of time periods that comprises a fourth set of resources for transmission of scheduling requests based at least in part on applying the periodicity between the fourth time period and the fifth time period, the fifth time period included in the first subset of time periods.

18. The method of claim 11, further comprising:
transmitting control signaling indicating a second periodicity and a second offset applicable to transmission of scheduling requests from the UE to the base station, wherein the periodicity and the offset are applicable to a first configuration for the plurality of time periods and the second periodicity and the second offset are applicable to a second configuration for the plurality of time periods.

19. The method of claim 11, wherein the plurality of time periods corresponds to a plurality of slots, each time period of the plurality of time periods corresponding to a respective slot of the plurality of slots.

20. The method of claim 11, wherein each of the plurality of time periods corresponds to a respective symbol.

21. An apparatus for wireless communication, comprising:
a processor;
memory coupled with the processor; and
instructions stored in the memory and executable by the processor to cause the apparatus to:
receive, from a base station, control signaling indicating a periodicity and an offset applicable to transmission of scheduling requests from the apparatus to the base station; and
transmit a scheduling request to the base station over a first time period selected from a plurality of time periods based at least in part on applying the periodicity and the offset to a first subset of time periods of the plurality of time periods that include resources for transmission of scheduling requests that do not overlap with resources allocated for downlink transmissions, wherein applying the periodicity comprises counting the periodicity and the offset with respect to time periods of the first subset of time periods, the first subset of time periods comprising the first time period.

22. The apparatus of claim 21, wherein the instructions are further executable by the processor to cause the apparatus to:
refrain from applying the periodicity and the offset to a second subset of time periods of the plurality of time periods, wherein for the second subset of time periods the resources for transmission of scheduling requests at least partially overlap with resources allocated for downlink transmissions.

23. The apparatus of claim 22, wherein:
the plurality of time periods comprises a second time period that includes a first portion allocated for downlink transmissions and a second portion allocated for uplink transmissions, and the second subset of time periods comprises the second time period based at least in part on determining that the first portion allocated for downlink transmissions overlaps with one or more symbols for transmission of scheduling requests.

24. The apparatus of claim 22, wherein:
the plurality of time periods comprises a third time period that includes a first portion allocated for downlink transmissions and a second portion allocated for uplink transmissions, and
the first subset of time periods comprises the third time period based at least in part on determining that the resources for transmission of scheduling requests overlap with a portion of the third time period allocated for uplink transmissions.

25. The apparatus of claim 21, wherein the instructions are further executable by the processor to cause the apparatus to:
determine a starting time period of the plurality of time periods for applying the offset, the starting time period included in the first subset of time periods; and
identify a fourth time period of the plurality of time periods that comprises a first set of resources for transmission of scheduling requests based at least in part on applying the offset to the starting time period, the fourth time period included in the first subset of time periods, wherein transmitting the scheduling request is based at least in part on identifying the fourth time period.

26. The apparatus of claim 25, wherein the instructions are further executable by the processor to cause the apparatus to:
identify a fifth time period of the plurality of time periods that comprises a fourth set of resources for transmission of scheduling requests based at least in part on applying the periodicity between the fourth time period and the fifth time period, the fifth time period included in the first subset of time periods.

27. The apparatus of claim 21, wherein the instructions are further executable by the processor to cause the apparatus to:
receive control signaling indicating a second periodicity and a second offset applicable to transmission of scheduling requests from the apparatus to the base station, wherein the periodicity and the offset are applicable to a first configuration for the plurality of time periods and the second periodicity and the second offset are applicable to a second configuration for the plurality of time periods.

28. An apparatus for wireless communication, comprising:
a processor;
memory coupled with the processor; and
instructions stored in the memory and executable by the processor to cause the apparatus to:
transmit, to a user equipment (UE), control signaling indicating a periodicity and an offset applicable to transmission of scheduling requests from the UE to the apparatus; and
monitor for a scheduling request from the UE over one or more time periods from a plurality of time periods, wherein the one or more time periods are determined based at least in part on applying the periodicity and the offset to a first subset of time periods of the plurality of time periods that include resources for transmission of scheduling requests that do not overlap with resources allocated for downlink transmissions, wherein applying the periodicity comprises counting the periodicity and the offset with respect to time periods of the first subset of time periods.

29. The apparatus of claim 28, wherein the instructions are further executable by the processor to cause the apparatus to:
refrain from applying the periodicity and the offset to a second subset of time periods of the plurality of time periods, wherein for the second subset of time periods the resources for transmission of scheduling requests at least partially overlap with resources allocated for downlink transmissions.

30. The apparatus of claim 28, wherein the instructions are further executable by the processor to cause the apparatus to:
transmit control signaling indicating a second periodicity and a second offset applicable to transmission of scheduling requests from the UE to the apparatus, wherein the periodicity and the offset are applicable to a first configuration for the plurality of time periods and the second periodicity and the second offset are applicable to a second configuration for the plurality of time periods.

* * * * *